US005673418A

United States Patent [19]
Stonier et al.

[11] Patent Number: 5,673,418
[45] Date of Patent: Sep. 30, 1997

[54] METHOD AND APPARATUS FOR EMULATING THE OPERATIONS OF AN EMULATED SYSTEM TERMINAL DRIVER ON A HOST SYSTEM

[75] Inventors: James W. Stonier, Tewskbury; Michael E. Tessier, Tyngsboro, both of Mass.

[73] Assignee: Bull HN Information Systems Inc., Billerica, Mass.

[21] Appl. No.: 319,848

[22] Filed: Oct. 7, 1994

[51] Int. Cl.$^6$ ............................. G06F 3/00; G06F 13/00
[52] U.S. Cl. ..................... 395/500; 395/284; 395/703; 395/800; 364/933.9; 364/940; 364/946.7; 364/949.4; 364/DIG. 2
[58] Field of Search ..................... 395/500, 828, 395/733, 700, 284, 703, 800; 364/280, 280.8, 280.9, 933.9, 940, 946.7, 949.4, DIG. 2, 916

[56] References Cited

U.S. PATENT DOCUMENTS

| | | | |
|---|---|---|---|
| 4,677,588 | 6/1987 | Benjamin et al. | 364/900 |
| 4,727,480 | 2/1988 | Albright et al. | 395/500 |
| 4,920,481 | 4/1990 | Binkley et al. | 364/200 |
| 4,951,245 | 8/1990 | Bailey et al. | 395/828 |
| 5,077,657 | 12/1991 | Cooper et al. | 395/500 |
| 5,088,033 | 2/1992 | Binkley et al. | 395/500 |
| 5,179,703 | 1/1993 | Evans | 395/700 |
| 5,287,496 | 2/1994 | Chen et al. | 395/600 |
| 5,375,225 | 12/1994 | Dean et al. | 395/500 |
| 5,483,647 | 1/1996 | Yu et al. | 395/500 |
| 5,515,525 | 5/1996 | Grynberg et al. | 395/500 |

*Primary Examiner*—Kevin J. Teska
*Assistant Examiner*—Thai Phan
*Attorney, Agent, or Firm*—Faith F. Driscoll; John S. Solakian

[57] ABSTRACT

A host data processing system which includes a plurality of input/output devices operates under the control of an enhanced version of the UNIX operating system. The host system includes an emulator which runs as an application process for executing user emulated system (ES) application programs. The emulator includes a number of emulated system executive service components operating in shared memory and an interpreter, an emulator monitor call unit (EMCU) and a network terminal driver (NTD) component operating in the host memory. Configuration command means are provided for initially configuring a host terminal to operate in a plurality of asynchronous driver (ATD) modes implemented by the NTD component. When a terminal has been configured by a user to run applications written for the ATD driver, it sets a mode indication which causes the NTD component to respond to user applications as an ATD driver and determine if each ATD request can be carried out with functionality included within the NTD component. If the request can be carrier out, the NTD component translates ATD device specific information contained in each request into NTD device specific information which invokes the required functionality at the appropriate time so that the request can be processed by the NTD component. At the completion of each such request, the NTD component utilizing information contained in the original request updates the return status information to that of the ATD driver. This arrangement provides ATD applications access to NTD controlled host terminals without having to port ATD software or have users modify their existing applications.

19 Claims, 8 Drawing Sheets

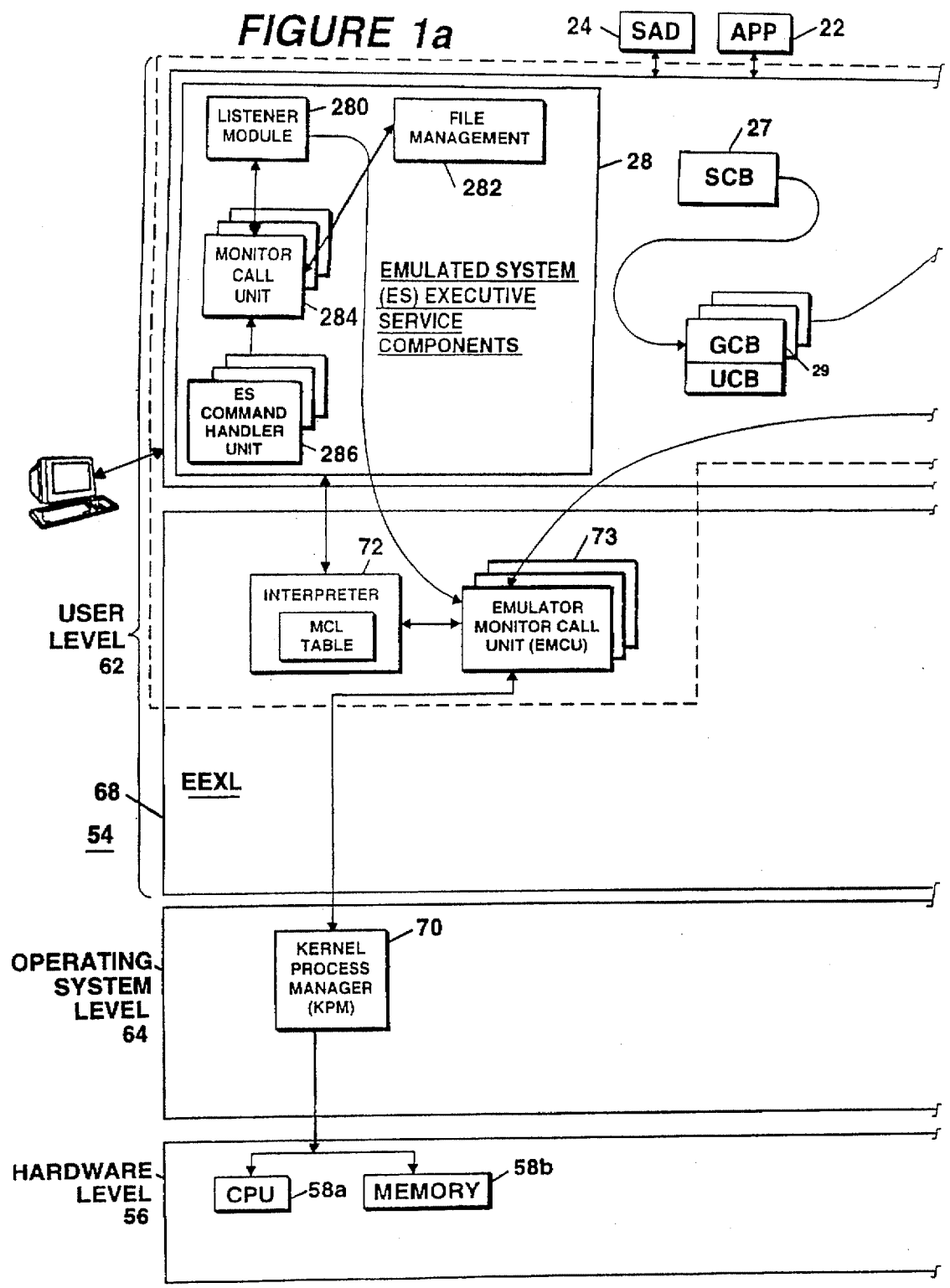

| WORD OFFSET | \multicolumn{16}{c}{BIT POSITION} |
|---|---|
| | 0 | 1 | 2 | 3 | 4 | 5 | 6 | 7 | 8 | 9 | A | B | C | D | E | F |
| 0/1 | IRB POINTER |||||||||||||||| 
| 2 | RETURN STATUS (RS) |||||||| | | | | | | | |
| 3 | LRN |||||||| B | | E | | FUNCTION ||||
| 4/5 | BUFFER ADDRESS - 2 WORD POINTER ||||||||||||||||
| 6 | RANGE - NUMBER OF BYTES TO BE TRANSFERRED ||||||||||||||||
| 7 | DEVICE - SPECIFIC WORD (DV1) ||||||||||||||||
| 8 | RESIDUAL RANGE - NUMBER OF BYTES NOT TRANSFERRED ||||||||||||||||
| 9 | DEVICE STATUS WORD 1 (DS1) ||||||||||||||||
| 10 | TOTAL IORB EXTENSION LGTH |||||||| PHYSICAL I/O EXTENSION LGTH ||||||||
| 11 | DEVICE - SPECIFIC WORD 2 (DV2) ||||||||||||||||
| 12 | DEVICE PHYSICAL CONTROL WORD 1 ||||||||||||||||
| 13 | DEVICE PHYSICAL CONTROL WORD 2 (VALID IF B BIT (E) IS 1) ||||||||||||||||
| 14 | ADDITIONAL STATUS (DS2) ||||||||||||||||
| 15 | CURSOR POSITIONING ||||||||||||||||
| 16 | DEVICE DEPENDENT: ATTRIBUTE OR DESCRIPTOR ||||||||||||||||
| 17 | PREORDER CONTROL ||||||||||||||||
| 18 | FIRST WORD OF LOGICAL PART OF IORB ||||||||||||||||

INPUT/OUTPUT REQUEST BLOCK (IORB)

FIGURE 4

METHOD AND APPARATUS FOR EMULATING THE OPERATIONS OF AN EMULATED SYSTEM TERMINAL DRIVER ON A HOST SYSTEM

RELATED APPLICATION(S)

1. The patent application of Richard S. Bianchi, Thomas S. Hirsch and Ron B. Perry entitled, "A Dual Decor Capability for a Host System which Runs Emulated Application Programs to Enable Direct Access to Host Facilities for Executing Emulated System Operations," filed on Sep. 23, 1994, bearing Ser. No. 08/311,655, which is assigned to the same assignee as this patent application.

2. The patent application of John L. Curley, Thomas S. Hirsch, James W. Stonier and Kin C. Yu entitled, "A Mechanism for Enabling Emulation System Users to Directly Invoke a Number of Host System Facilities for Executing Host Procedures Interactively or Non-Interactively," filed on Sep. 23, 1994, bearing Ser. No. 08/311,649, which is assigned to the same assignee as this patent application.

BACKGROUND OF THE INVENTION

1. Field of Use

The present invention relates to the emulation of one computer system by another computer system, and more particularly to software emulation of terminals.

2. Prior Art

With the rapid evolution of higher speed computer systems and new microprocessor chip designs, users now have even a greater need to have their application programs written for a specific computer system run on different computer systems. Moreover, it becomes more important than ever to provide this capability without having to convert or port such application programs. Therefore, a number of vendors have developed both hardware and software approaches to achieve this result without having to convert or port such application programs.

In emulating such computer systems, it becomes desirable to reduce development time and costs by defining certain applications or functionality associated with the emulated system which need not be supported. This is particularly true in the case of highly specialized complex components such as driver software which have been superseded by enhanced driver software which provides terminal communications interfaces able to handle advanced communications technologies as well as support certain communication terminals handled by older driver software. In such cases, vendors have encouraged application developers and system builders to migrate their applications over to such enhanced driver software.

But, it has been found that this transition requires rewriting older applications necessitating access to source code and documentation which is no longer available. Additionally, even after rewriting such applications, it still may not be possible to have them run properly due to design incompatibilities or due to the improper activation of new options available in the enhanced driver software.

Therefore, the basic approach in providing the user with the capability of running applications designed to utilize such older driver software has been to port such driver software to run on the host system. This approach results in increased development costs and still may not produce the desired performance.

Accordingly, it is a primary object of the present invention to provide a method and system which can accommodate emulated system applications written to use different driver characteristics.

It is still another object of the present invention to provide a method and system for accommodating different driver characteristics within an emulation environment on a host system which requires no changes to user applications.

SUMMARY OF THE INVENTION

The above and other objects of the present invention are achieved in a preferred embodiment of the host data processing system of the present invention which includes a plurality of input/output drivers and operates under the control of a non-proprietary operating system. In the preferred embodiment, the operating system is an enhanced version of the UNIX* operating system known as the AIX operating system developed by IBM Corporation. The host system includes an emulator which runs as an application process for executing user emulated system (ES) application programs which in the preferred embodiment were originally written for use on the DPS6 and DPS6000 family of computers and the GCOS6* and HVS operating system developed by Bull HN Information Systems Inc.

*UNIX is a registered trademark in the United States and other countries, licensed exclusively through X/Open Company Limited.
**AIX is a registered trademark of International Business Machines Corporation.
***GCOS is a registered trademark of Bull HN Information Systems Inc.

The emulator includes a number of emulated system executive service components (e.g., HVS executive service components) operating in ES and host system shared memory environment and an interpreter, an emulator monitor call unit (EMCU) and a network terminal driver (NTD) component operating in the host system memory environment. The NTD component provides an enhanced terminal communications interface and an architecture which is highly adaptable for use with new terminals and advanced communications technologies. Configuration means is provided within the host system for initially configuring each terminal which is to utilize the family of ATD asynchronous driver modes.

In the preferred embodiment, this is carried out by a user entering a keyword into the system configuration file which causes the setting of an ATD mode bit within a resource control table (RCT) structure associated with the particular terminal when the emulator is started. Prior to performing a connect operation, the user application normally issues a monitor call for determining which driver software is servicing the terminal. According to the present invention, the NTD component will return a value designating that the ATD driver software is servicing the terminal. This eliminates the need for having to make any changes to existing applications.

According to the present invention, the NTD component includes an input/output request block (IORB) preprocessor unit which receives each ATD driver request of a configured terminal from an IORB processor. The IORB preprocessor determines if the ATD application request specifies a mode of operation which is capable of being executed by functionality present within the NTD component. Such functionality is designated through the use of a plurality of options or functions which are specified/defined by device specific information bits contained within the IORB accompanying the ATD request. Also, additional functionality has been included in certain parts of the NTD component in order to carry out unsupported ATD driver functions or operations of different drivers. In the case of such unsupported functions, the added functionality is enabled at either the preprocessor or post processor level, whichever is more efficient. Thus, the invention takes advantage of the architecture of the NTD driver which makes it more readily adaptable to new environments.

If the IORB preprocessor unit determines that the request is supported by functionality contained in the NTD component, it stores a copy of the device specific information provided by the ATD request. According to the present invention, the preprocessor unit then maps or translates the ATD device specific information into a set of NTD options or functions which will enable the execution of the request by the different sections of the NTD component. The converted device specific information it then passed back to the IORB processor for validation. The information is validated by the IORB processor unit in the same way as NTD requests are validated to ensure reliable execution. Validated requests are thereafter dispatched and processed utilizing the specified functionality of the NTD component. At the completion of the operation, a post processor unit maps or restores the previous stored ATD device specific information as required.

In accordance with the teachings of the present invention, in the case of special system applications print screen, the preprocessor unit is selectively bypassed by the NTD component. This allows such applications to take advantage of existing NTD functionality or functions utilized by the NTD component to perform certain operations while the NTD component is still being operated in ATD mode. Thus, the NTD component can be viewed as providing two kinds of functionality.

BRIEF DESCRIPTION OF THE DRAWINGS

FIGS. 1a and 1b show in form block diagram a host system which incorporates the NTD component according to the teachings of the present invention.

FIG. 4 illustrates the organization of the input/output request block (IORB) utilized by the present invention.

DESCRIPTION OF THE PREFERRED EMBODIMENT

Figure 1B:
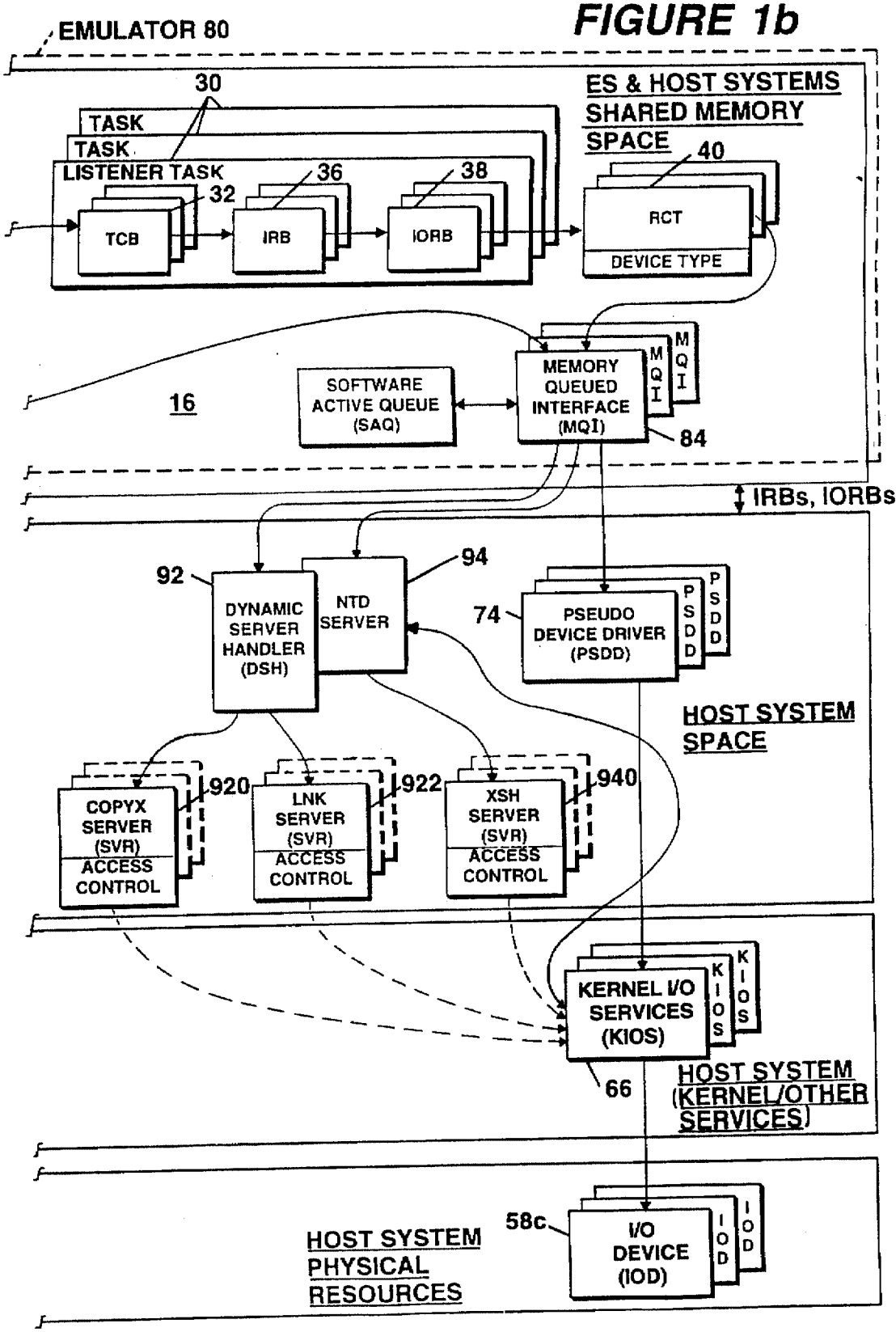

FIGS. 1a and 1b show in block diagram form a host system 54 which incorporates the network terminal driver (NTD) component of the present invention. As shown, the system 54 includes a hardware platform 56 which contains the hardware elements such as a central processing unit 58a, a main memory 58b and a number of input/output peripheral/communications drivers including a local area network for connecting system 54 to other processing systems via standard communication network facilities. The central processing unit (CPU) represented by block 58a is a reduced instruction set (RISC) based processing unit which takes the form of the RS6000 microprocessor manufactured by IBM corporation. The hardware platform 56 may also take the form of the DPX/20 system marketed by Bull HN Information Systems Inc.

As seen from FIGS. 1a and 1b, hardware platform including processing unit 58a operates under the control of an enhanced version of the UNIX operating system such as the AIX operating system. Portions of physical memory represented by MEM block 58b are illustrated in terms of the layered construction. As shown, memory is divided into two basic levels, a user level and a kernel level. The user level is divided into emulated system (ES) and host shared memory space and host or native memory space. The shared memory space contains the ES executive level 16 which includes a plurality of executive program tasks 30 spawned by ES executive services components of block 28 for executing ES application programs 22 and system administrator programs 24.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as well as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

The input/output request block (IORB) structure 38 is used as the standard means of requesting a physical I/O service. As explained in greater detail herein, it contains information such as a logical resource number (LRN) that identifies the I/O driver being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

For further information regarding such structures and their relationships to each other, reference may be made to U.S. Pat. No. 5,111,384 and the publication entitled "HVS PLUS Systems Concepts" published by Bull HN Information Systems Inc., Order No. HE03-01.

As indicated in FIG. 1b, the shared memory space further includes a memory queued interface (MQI) represented by block 84 which provides a form of interprocess communication mechanism and a soft-ware active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo drivers 74 and the software active queue 88.

Executive Services Components 28

As seen in FIG. 1a, the executive services components 28 of executive layer 16 includes a plurality of components or facilities which are equivalent to those facilities normally included in emulated system. The facilities utilized by the present invention include a listener module 280, a file management facility 282, a monitor call unit 284 and a ES command handler unit 286 which are arranged as shown. The listener module 280 is responsible for monitoring the operations of terminals configured for login and for initiating user processes in response to user commands. As indicated in FIG. 1a, listener module 280 runs as a task 30 with its own set of unique data structures.

As described herein, the listener module 280 is able to consult a profiles file containing user specific registration information such as user id, login id and password requirements tabulated by the system administrator for all registered users. The listener module 280 checks the user profile when verifying the privileges and/or restrictions given to each user. The file management facility 282 includes the conventional shared data structure and set of routines normally provided to perform functions that access such data structure to control the synchronization of concurrent processes or tasks in addition to performing various system services or functions. That is, the facility responds to system service monitor calls identifying the types of services requested (e.g. creating or deleting files, reading or writing records or blocks in files) which result in the specified system services being executed by the emulated system on behalf of executing user application programs.

The monitor call unit 284 receives monitor calls from the interpreter component 72 which are in turn to be executed interpretively using the ES executive service components of block 28. The command handler unit 286 contains the routines that respond to user commands entered via a terminal or program. In response to such commands, the unit 286 routines invoke the appropriate processes for executing such commands.

Emulator Level Layer 68

As indicated in FIG. 1a, the next layer within the user level is the emulator executive level 68. This level includes certain components present in the emulated system which have been transformed into new mechanisms which appear to the remaining unchanged components to operate as the original unchanged components of the emulated system. At the same time, these new mechanisms appear to the components of the kernel level 64 as native components with which the host system is accustomed to operate. As shown, the components include the interpreter 72, an emulator monitor call unit (EMCU) 73, a plurality of servers 90 through 940, and a plurality of pseudo driver drivers (PSDD) 74 arranged as shown.

The interpreter 72 successively fetches the instructions of an emulated system application program, categorizes each instruction and executes it interpretively through sequences of RISC instructions which allows CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (server). The EMCU 73 is responsible for acquiring from the host system 54, the necessary memory and other resources, for initializing the emulated system data structures and invoking interpreter 72 and the various server processes. Both the interpreter 72 and EMCU 73 run as host processes but not as root.

As viewed by the host system, the ES service components 28 and tasks 30 being executed on behalf of the application programs, the interpreter 72 and EMCU 73 are executed in the system 54 of FIGS. 1a and 1b as a single process 80 wherein such process corresponds to one or more user processes as defined by the conventions of the host operating system being run on host system 54. Thus, it is possible to have multiple instances of the emulated system concurrently emulated on host system 54.

The dynamic server handler (DSH) 92 and the network terminal driver (NTD) server 90 are created by EMCU 73 during initialization. Each of the servers 90 and 92 communicate with emulated system processes through MQI 84 as indicated. The lower level group of servers 920, 922 and 940 are dynamically created by their respective higher level servers 90 and 92 for carrying out operations. All of the servers operate as root and therefore have super user privileges with access to any file within the host system 54.

As indicated in FIGS. 1a and 1b, the emulator executive level 68 further includes a plurality of pseudo dryers (PSDD) 74 for each input/output driver or type of input/output driver which is required to be emulated by host system 54. For example, the pseudo driver drivers 74 will include PSDDs for terminals, disk drivers, tape drivers, displays and for certain communication drivers.

For a more detailed discussion of other aspects of the SAQ 88, MQI block 84, PSDD 74 and other emulator components, reference may be made to the related patent application.

Operating System/Kernel Level

The operating system/kernel level 64 includes the standard mechanisms and components normally included within the host operating system. As shown, level 64 includes a kernel process manager component 70 and a number of host kernel I/O services (KIOS) processes 66 for each pseudo driver (PSDD) 74 which is to be emulated by the host system and for each of the servers 920 through 940 assigned to execute dual decor commands and functions.

Additionally, in the preferred embodiment of host system 54, level 64 is assumed to contain the standard utility programs, shell, editors, compilers, etc. and libraries (e.g., I/O libraries, open, close) which are accessed in the host user mode. For further information regarding the use of such arrangements, reference may be made to publications of the IBM Corporation describing the AIX operating system.

NTD Server 94

Figure 2:
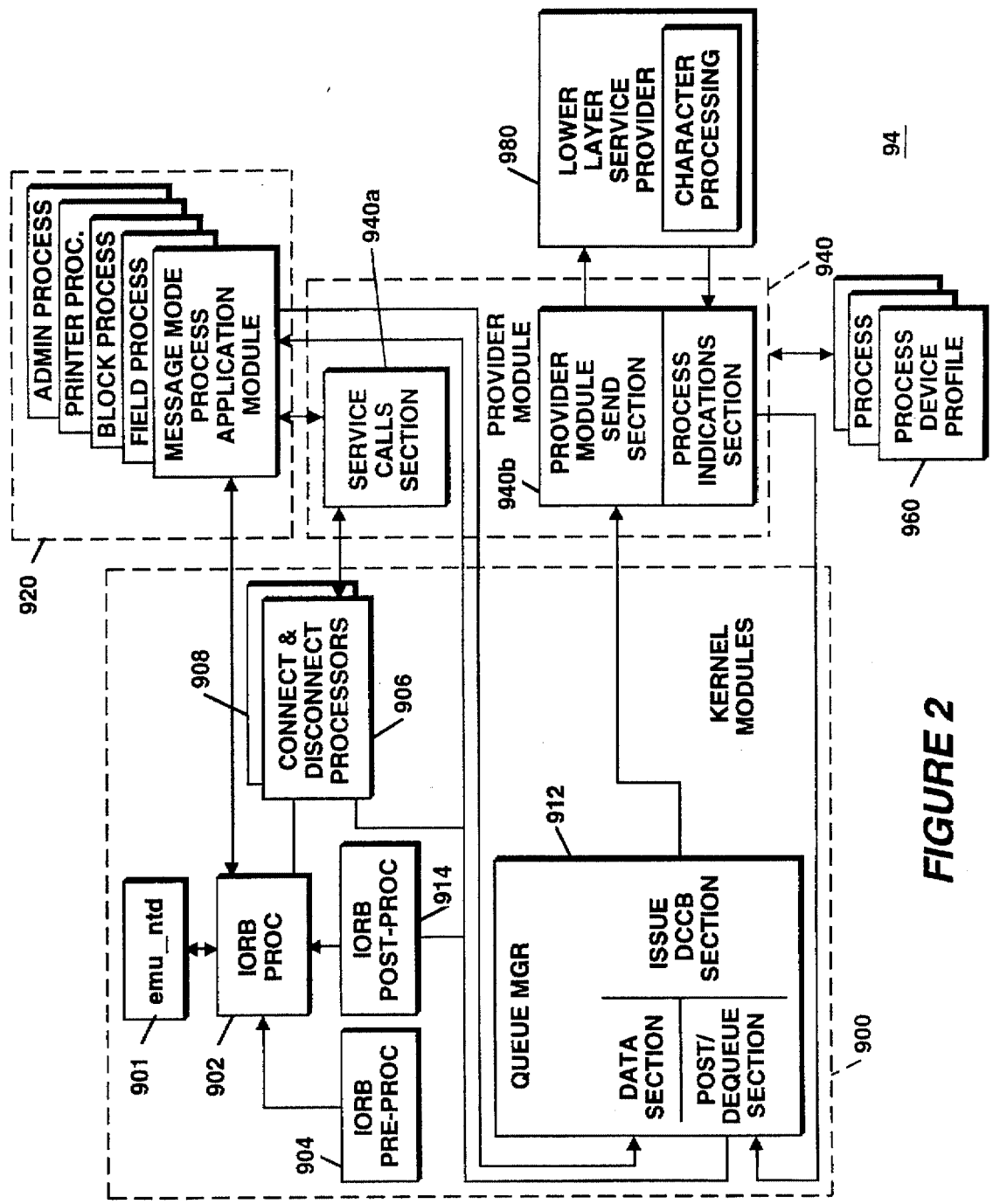
FIG. 2 is a diagram of the NTD component of the present invention.

FIG. 2 illustrates the overall organization of the NTD server 90. This organization is similar to that of the network terminal driver communications subsystem disclosed in U.S. Pat. No. 4,951,245 which issued on Aug. 21, 1990. As shown, the NTD server 90 includes several major pans which correspond to a kernel section 900, a provider module section 940, an application module section 920 and a device profile section 960. The kernel section 900 includes an emulator NTD unit 901, an IORB processor 902, connect and disconnect processors 906 and 908, a queue manager 912, a preprocessor unit 904 and a post processor unit 914. The emulator NTD unit of block 901 functions as the interface between the NTD component 90 and the MQI 84 and hence obtains each I/O request directed to the NTD component 90. It passes the IORB of each request to the IORB processor 902 for processing.

As explained in greater detail herein, the IORB is a data structure which defines the structural characteristics of the data being transferred between main memory and a specific host terminal (e.g. printer, data terminal etc.). It is the main function of the IORB processor 902 to validate the characteristics and constraints placed upon the data being transferred as defined by the IORB (e.g. range, the maximum number of characters being transferred during a particular transfer and the main memory starting address).

In accordance with the present invention, IORB preprocessor unit 904 operatively couples to the IORB processor 902. As explained in greater detail herein, the preprocessor unit 904 is invoked by the IORB processor when the I/O request originates from an ATD application which specifies a terminal previously configured to operate in ATD mode. The preprocessor 904 determines if the type of data transfer operation defined by the IORB can be carried out by functions included within the NTD component. If it can be so carried out, the preprocessor 904 performs the required conversion of certain device specific information contained within the IORB and transfers the converted IORB device specific information back to the IORB processor for validation.

Also, the IORB processor 902 operatively couples to connect and disconnect processors 906 and 908. The connect processor 906 manages the common connect responsibilities which include establishing and monitoring the connection of NTD component 90 to the user application and initiating the configuring of the specific terminal involved in the communication. The disconnect processor 908 manages the common disconnect responsibilities for all of the modes supported by NTD component 90.

It is also seen from FIG. 2 that the IORB processor 902 operatively connects to a plurality of application modules of application module section 920. The application modules are designed to perform mode specific processing on I/O requests. As shown, the application modules include message mode, field mode, block mode, printer mode and administrative mode application modules. Message mode is used primarily by the file system which treats a terminal configured as a sequential file. It also provides the necessary support for transferring files across an asynchronous connection to/from a personal computer using protocols such as KERMIT. Thus, the message mode application module of block 920 provides support for line-at-a-time or a command line entry. The data transfers essentially take place on a character at a time basis.

Field mode allows forms-oriented processing to be performed on certain terminals by applications, such as display formatting and control (DFC), menu subsystem, and data entry facility. Hence, the field mode application module of block 920 provides support for field-at-a-time entry and performs certain validation functions.

Block mode is for transferring blocks of fully edited input between a terminal device and a host system. Thus, the block mode application module 920c supports block data transfers which typically involve 256 byte blocks.

Printer mode provides full control-byte processing and also detects and analyzes, in some cases, printer off-line conditions. It supports standalone serial printers that use no protocols as well as printers which utilize a certain protocol (ASPI). Also, the printer application module of block 902 provides support for both standalone printers and printers which connected to buffered printer adapter (BPA) devices.

The administrative mode is typically used to obtain data from a terminal without requiring operator intervention. Examples include requesting terminal status, cursor positioning and obtaining a current copy of the screen image. Thus, the administrative mode application module 902e provides an interface to the terminal devices and is also used internally by the NTD component 90 to perform certain services specified by an IORB such as device configuration when NTD component 90 is operating in other modes. For further information regarding the different modes provided by NTD component 90, reference may be made to the publication entitled "System Programmer's Guide", Volume 1 published by Bull HN Information Systems Inc., order number LH22-01.

A particular application module is selected as the result of a connect request and it lasts or remains operative throughout the connection. The selected application module parses the device specific information contained in each IORB and translates such information into a number of calls which are forwarded by a module dispatcher (not shown) along with the appropriate parameters to the provider module section 940. This section includes a service calls section 940a and a send and process indications section 940b. The provider module 940 provides the required software interface to the device profiles of section 960 and to a lower layer service provider 980 as shown. The device profiles contain all the information necessary for the NTD component 90 to support such devices. Each profile may contain a table which includes information such as profile name, profile description, code set supported, modes supported, system device and driver identifier and required character sequences. The table driven approach permits the addition of new devices without major changes to the NTD component 90.

The provider module 940 in turn creates one or more microorders termed device driver control blocks (DDCBs) on behalf of the calling application module to perform the required functions. The DDCBs are attached to a provider module control block (PMCB) which contains a pointer to the original IORB, inserted by the IORB processor. The PMCB is a data structure used for maintaining the status of the overall operation during the execution of the DDCBs in response to the IORB. The PMCB and DDCBs are then passed to queue manager 912. As shown, queue manager 912 includes a data section, a post/dequeue section and an issue DDCB section. The PMCB and DDCBs blocks for the requested terminal are enqueued in the data section and issued to provider module section 940b via the issue DDCB section. A send section of provider module section 940b passes each of the DDCBs to the lower layer provider 980 which in turn performs the specified microoperation on the designated terminal.

When the provider module 940b is finished with the DDCB, it calls the queue manager 912 post/dequeue section which copies any pertinent status. The queue manager 912 operatively couples to an IORB post processor unit 914. As explained in greater detail herein, the post processor unit 914 receives the NTD status and converts it as required to provide the proper return status to the ATD application when NTD component 90 has been configured to operate in the ATD mode (i.e. as an ATD driver).

In the preferred embodiment, the lower layer service provider 980 establishes the interface to the kernel input/output services of host system 54. In the preferred embodiment, provider 980 makes available a character at a time transfers using host I/O primitives. New functionality which corresponds to the character processing portion of block 980 implements AXD file transfer special control character processing (i.e., provides different control character interpretations).

Input/Output Request Block Data Structure

FIG. 4 illustrates the format of the IORB data structure. As indicated, the IORB data structure includes sixteen words, each having bit positions hexadecimal 0 through f. The word offsets 0 and 1 contain information which points to the IRB in memory. Word offset 2 includes a return status byte which may indicate if the device was unavailable or the operation was aborted or there was invalid information passed to the device by the application.

The left byte of the word offset 3 contains the logical resource number (LRN) which identifies the device for which the IORB is intended to be used. The right byte includes a function code which defines the operation the IORB is to perform. Typical operations are connect, disconnect, read or write. The B bit in position 9 is used to indicate if the buffer starts in the left hand or right hand byte of the word. The E bit in position B is used to indicate that the IORB is extended for at least ten words. Normally, the IORB ends after word offset 9. The extension is used for field mode operations and its size is always stored in word offset 10.

Word offsets 4 and 5 contain the two word (32 bit) starting address in main memory of the data buffer which stores the data involved in the transfer between the device and main memory when the IORB specifies a transfer operation. Word offset 6 is used to store the range which corresponds to the number of bytes being transferred.

Word offset 7 is a device specific word which includes bits indicating the options to include with the order. For example, for the field mode application, a bit is used to specify that data keyed for a reand IORB is also to be displayed on the screen. Word offset 8 is used to indicate at the completion of an order, the number of bytes not transferred. Word offset 9 is used to store device status word 1 which provides additional status to the status stored in word offset 2. An example of such status is to indicate if a parity error was sensed by the lower layer service provider during a read operation.

Word offset 10, byte 1 is used to store the number of words which the IORB has been extended. Byte 2 is used to store the number of words in the IORB extension. This word is present only When the E bit position in word offset 3 is set to a binary ONE state.

Device specific word 2 of word offset 11 is used for providing additional information on how the operation is to be processed. In field mode, for example, this word offset would be used to specify the validation criteria, such as standard or a special set of validation criteria. Word offset 12 is used for indicating some of the physical characteristics of executing the operation. For example, it may be used to indicate the number of key strokes used by the operator. It also is used to provide information for the supervisory message line at the bottom of the display screen at connect time.

Word offset 13 is used for two purposes. Initially, for field mode read operations, it contains an offset to the field position where data entry should begin. Finally, when the read operation is completed, it is used to store an indication of the number of remaining characters ready for immediate processing upon receiving the next read operation from the user application. This enables the application to create the next read IORB with a range large enough to handle the remaining characters.

Word offset 14 is used to store additional status information. For example, in field mode, it is used to indicate that valid data was entered into the field by the operator. Word offset 15 is used to store information for the application to determine the location of the cursor at the completion of the operation. Word offset 16 is used to store information that identifies the character keyed by the operator that terminated the read operation. Word offset 16 is also used to store an indication of whether or not an illegal entry was made.

Word offset 17 is used for multiple purposes. Initially, it is used to store pre-order information such as indicating the sending of a line feed, carriage return character before starting the operation. It may also be used for setting the display attributes for the operation such as low intensity, blink and inverse video. Word offset 11 bits are used to define the use of word offset 17. Upon termination of the read operation, it is used to store the characteristics that the illegal entry did not satisfy. For legal entry, it may be used for storing additional read termination information.

Word offset 18 is used for providing the first word of the descriptor for a read operation. The descriptor is used to specify the characteristics of the data to be entered into the field.

Mapping of ATD Driver Modes

The ATD driver is capable of operating in a plurality of modes. The modes include a TTY mode which provides for line-at-a-time input and output, a field mode for forms oriented processing a block mode for locally editing terminal input without ATD driver involvement, an ASPI mode which supports selected serial and letter-quality receive only printers and X-ON/X-OFF mode (termed ATD AXD mode) which supports asynchronous devices that use the X-ON/X-OFF flow control protocol.

The AXD mode has a number of operational modes (submodes) such as terminal mode, printer mode, filetran mode and raw mode. The filetran submode is the mode used for receiving data non-transparently from a device or another system using AXD mode. In this submode, the echo feature can be optionally used to signal to the sending application that data has been properly received. The raw submode is used to receive data transparently from a device or another system using AXD mode. For further information regarding the ATD modes, reference may be made to the previously referenced Systems Programmer's manual.

The ATD TTY mode has been deemed equivalent to NTD message mode, the ATD field and block modes to NTD field and block modes and the ATD ASPI mode to NTD printer mode. The ATD AXD mode has been deemed equivalent to NTD message mode for certain submodes (i.e., raw and filetran). Therefore, it has been noted that certain options available in the ATD driver are also common to the NTD driver. This equivalency is utilized by the present invention to enable the execution of ATD applications request. The ATD device specific information contained in the IORB of FIG. 4 is used to exploit this equivalency and to invoke certain functionality added to the NTD component 90 for the purpose of accommodating other ATD operational modes in accordance with the teachings of the present invention.

The present invention compares the functions specified by the option bits of the ATD and NTD device specific words for each different mode of operation and groups them into a number of different categories. These categories include common options, mappable options and unsupported options. The bits defining the common options are those ATD device specific bits which specify the same or equivalent functions and have the same bit positions in NTD. The bits defining mappable options are those ATD device specific bits which specify the same or equivalent functions but have different bit positions in NTD. The bits defining unsupported options are those ATD and NTD device specific bits which have no equivalency.

Preprocessor Unit 904

According to the teachings of the present invention, the preprocessor unit 904 includes mask mechanisms for performing the required translation and mapping of ATD option bits into NTD bits for each equivalent NTD mode and each type of operation (e.g. connect, read, write, disconnect). The different masks used for performing such mappings are illustrated in the Appendix. Additionally, in certain instances where there is no equivalent option provided by NTD component 90, mapping is accomplished by referencing i specific bit contained in a particular application module. An example of this occurs in the case of a ATD TTY mode write operation in wherein the state of a bit designates if a control byte is a terminal process control byte or a printer control byte. Here, mapping is accomplished by utilizing internal control information.

Additionally, the preprocessor 904 includes mechanisms for detecting a special system function such as a print screen command wherein no translation or mapping is performed.

This enables the command to be executed by the NTD component 90 while operating in ATD mode.

Post Processor Unit 914

At the completion of an operation or order (e.g. connect, read, write, disconnect), the NTD component 90 posts process IORBs. When NTD component 90 is running in ATD mode, the IORB was modified by preprocessor unit 904. Therefore, post processor unit 914 operates to restore the appropriate portions of the IORB as required by the ATD application. This includes the translation of NTD status into ATD format.

Additionally, in accordance with the present invention, the post processor unit 914 includes mechanisms for enabling certain functionality added to the lower layer provider 980 upon completion of an initial order or operation (i.e., connect). This arrangement enables the NTD component 90 to accommodate or support additional ATD modes of operation. The added functionality is set up according to the original ATD device specific bits as discussed herein. At the completion of executing subsequently issued ATD application orders (e.g. read, write, disconnect), the post processor unit 914 generates ATD status values as required from any NTD error codes received from the added functionality.

DESCRIPTION OF OPERATION

Figure 3A:
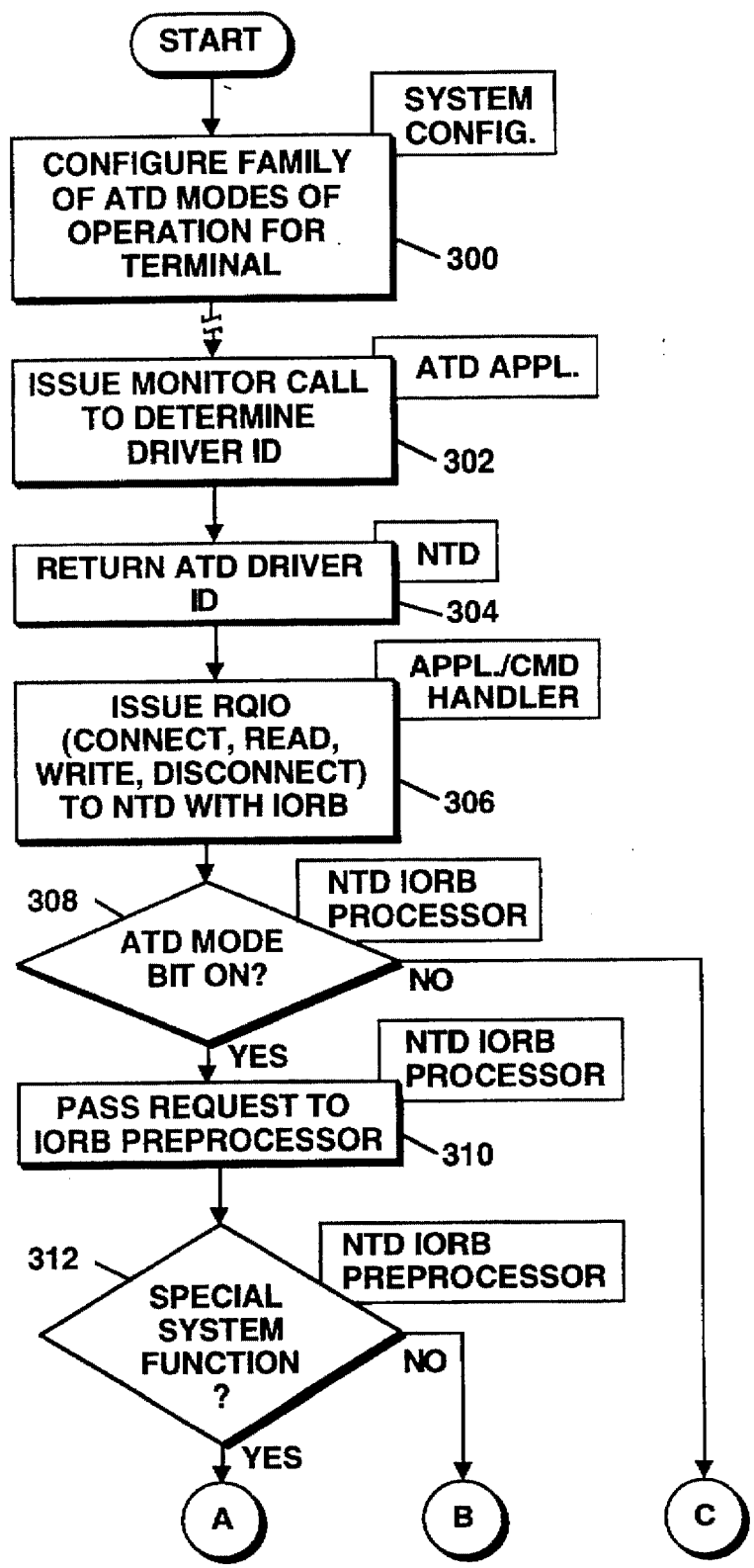
FIGS. 3a through 3d are flow charts used in describing the operation of the present invention.
Figure 3B:
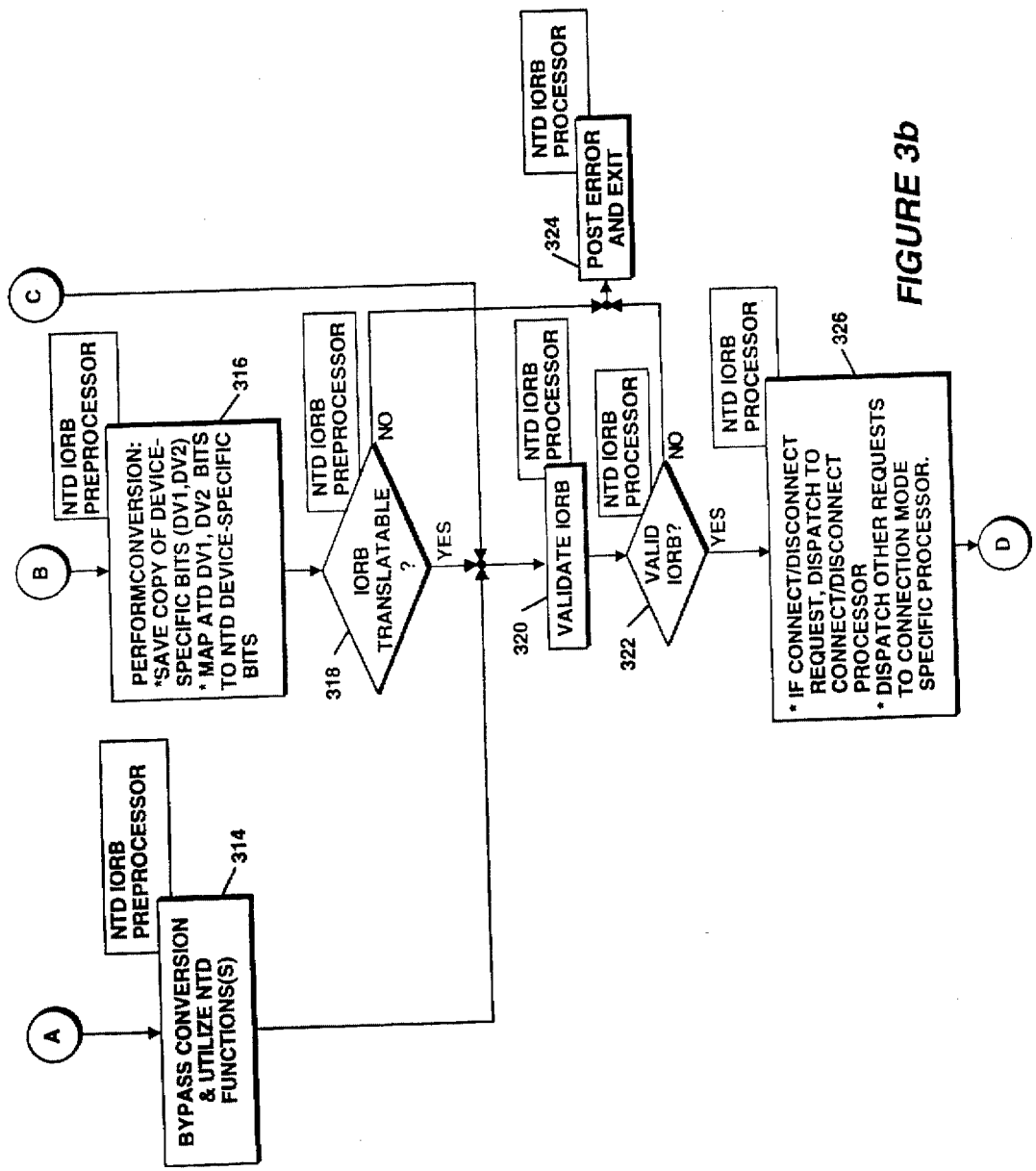
Figure 3C:
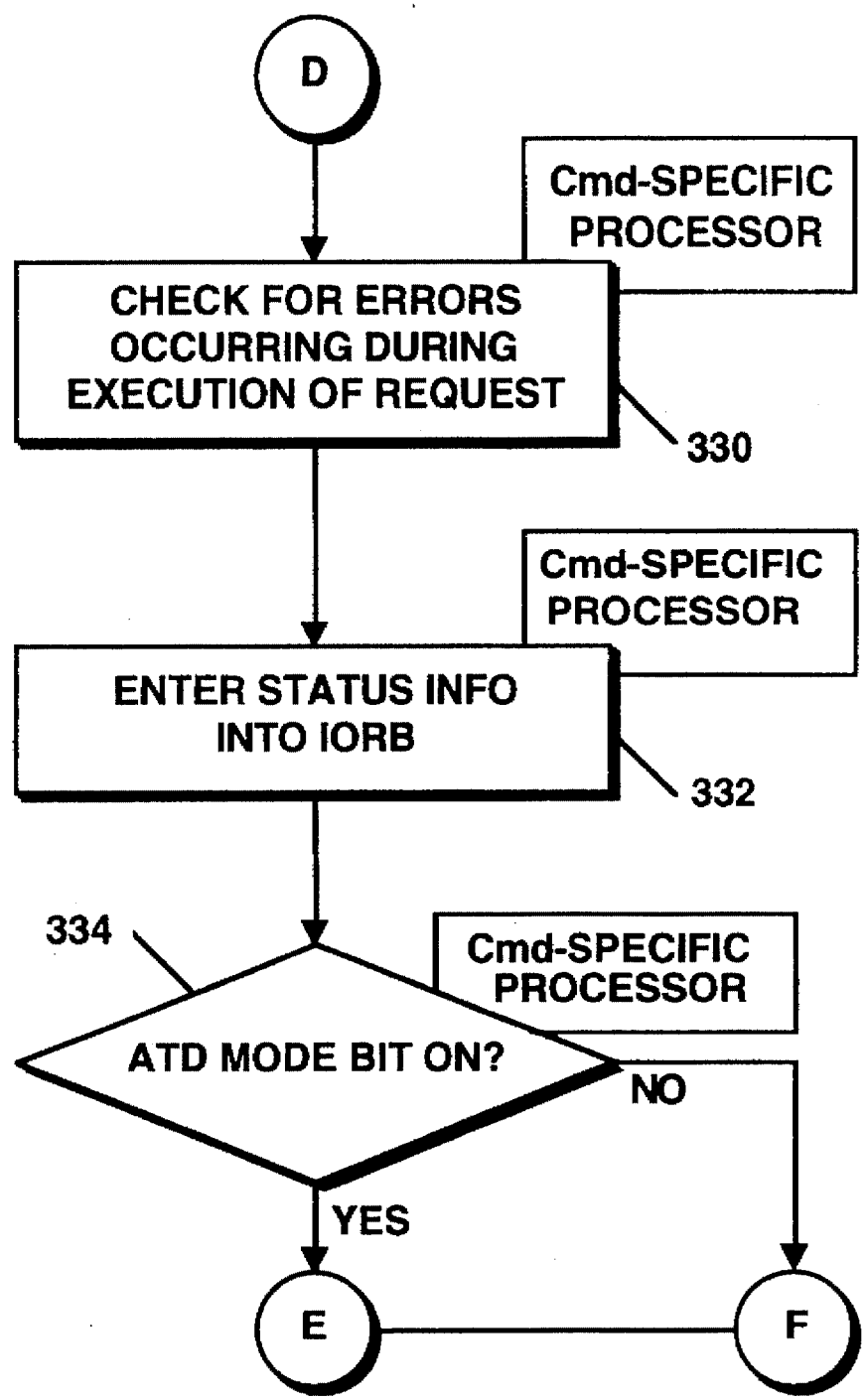

With reference to FIGS. 1a and 2b, the operation of a preferred embodiment of the NTD component of the present invention will now be described with reference to the flow charts of FIGS. 3a through 3c. As indicated in FIG. 3a, each application user through a configuration directive command initially specifies which terminals are to operate in a family of ATD modes (block 300). System configuration software within the host system 54 at boot time, operates to Set the appropriate ATD mode bit in the resource control table (RCT) of each terminal so configured.

Subsequently, when an ATD application is run, it first issues a standard macro or monitor call for the purpose of determining the identity of the driver which will be carrying out the communications (block 302). The monitor call is carried out in a conventional manner and results in the issuance of an input/output request (RQIO) to NTD component 90. When NTD component 90 has been configured to operate in ATD mode relative to that terminal, it responds to the monitor call by returning the id of the ATD dryer (block 304). Thus, the ATD application operates as if it were connected to the ATD driver for which it was designed to use.

Upon receipt of the driver id information, the user application is now ready to issue a connect request to establish a connection with the ATD driver. This results in the application issuing a RQIO to NTD component 90 which returned the ATD dryer id. The request is processed by emulator monitor call unit 73 and dispatched onto the NTD queue section of the memory queued interface 84 (block 306). The RQIO is accompanied by an IORB formatted as shown in FIG. 4. Since the ATD application issued the IORB, the device specific information as well as other driver specific information corresponds to that utilized by the ATD dryer.

In response to the request, the emu-ntd section 901 obtains the request from MQI 84 and passes the IORB to the IORB processor 912. The IORB processor 912 first determines from the terminal's RCT if the terminal has been configured to utilize the family of ATD modes (block 308). Assuming that it has been so configured, then the ATD bit will be on specifying IORB preprocessing which results in the IORB being passed to the preprocessor unit 904 (blocks 308 and 310).

In accordance with the teachings of the present invention, preprocessor unit 904 determines if the IORB designates a special system function (block 312) which although invoked by an ATD application user, results in the use of a facility that uses NTD formatted commands. Normally, special commands will be issued following completion of a connect operation. An example of this is the print screen facility which when invoked by a user during a read or write order causes an NTD IORB to be issued to NTD component 90. The print screen facility also sets a special indicator bit in the RCT associated with the ATD configured terminal. The IORB causes the NTD component 90 to suspend I/O from the user application and examine the RCT special indicator bit.

When the special indicator bit has been set, the preprocessor 904 bypasses the translation or conversion of the ATD IORB. This allows the ATD application to utilize the NTD component 90 print screen facility which uses NTD command formats to provide the required functionality. This ensures compatibility with the existing NTD functionality and eliminates having to make any changes in the NTD component 90.

The preprocessor 904 determines the type of IORB (i.e. connect, disconnect, read, write). Since it is a connect IORB, the preprocessor unit 904 then determines the ATD connection mode (e.g. TTY, Field, Block, ASPI, AXD-Raw or Filetran) and stores mode information away in the terminal's RCT for future reference. After validating that the IORB function code is legal in ATD mode, the preprocessor unit 904 first saves a copy of the ATD device specific words in the PMCB created by the IORB processor for later use in restoring.

Preprocessor unit then maps the ATD device specific bits contained in the IORB device specific words of FIG. 4 (block 316) to the NTD device specific bits. More specifically, preprocessor unit 904 translates the DV1 and DV2 words for each connection mode ATD supports. It sets up the DV1 word initially with those bits common to both ATD and NTD. The common bits for a connect are labeled C_COM_TTY, C_COM_BLK, C_COM_FLD, C_COM_ASP, and C_COM_AXR for designating common connect DV1 bits for TTY mode, Block mode, Field mode, ASPI mode and AXD raw mode respectively. The same designations are used for disconnect, read and write with the exception that the first letter is replaced with a "D" (disconnect), "R" (read) or "W" (write). The mapping of these "common bits" is illustrated in the Appendix.

The preprocessor unit 904 then tests for the presence of other ATD bits which are equivalent to NTD bits and translates those other ATD bits to NTD equivalents. Also, in the case of field mode, the preprocessor unit 904 maps on a one to one basis bits within the second device specific word DV2 (these bits are "common bits"). During the conversion process, the preprocessor unit 904 is able to determine if the IORB is translatable (block 318). If it is translatable without errors, the preprocessor unit 904 forwards the IORB back to the IORB processor 912 for validation. The IORB is validated in the same way as an NTD IORB (block 320). That is, it verifies that the common IORB options are specified in the device specific words and that the proper application module and terminal device are connected.

If the IORB is valid, then the IORB processor 912 creates a PMCB for the IORB and calls the provider module via the module dispatcher to create the required microorders (DDCBs). Following this, the IORB processor calls the appropriate application module via the module dispatcher. If there any mode specific microorders to be generated, the provider module generates them on behalf of the specific application module. The queue manager issue DDCB section issues the DDCBs to provider module send section 940b via the module dispatcher which in turn provides them to the lower layer service provider 980. When all of the DDCBs have been processed, the lower layer service provider 980 returns the appropriate status information to the provider module which passes it on to the queue manager post/deenque section. As indicated in FIG. 3c, NTD component 90 checks for errors occurring during the execution of the operation and enters the status into the IORB (blocks 330 and 332).

The status information contained in the IORB is also sent to the IORB post processor unit 914 which performs the post processing of the IORB (block 336). If the IORB function code specified a connect, disconnect, read or write operation then the IORB was modified by the preprocessor unit 904. Therefore, post processor unit 914 maps the NTD status values into ATD equivalents (block 346).

Figure 3D:
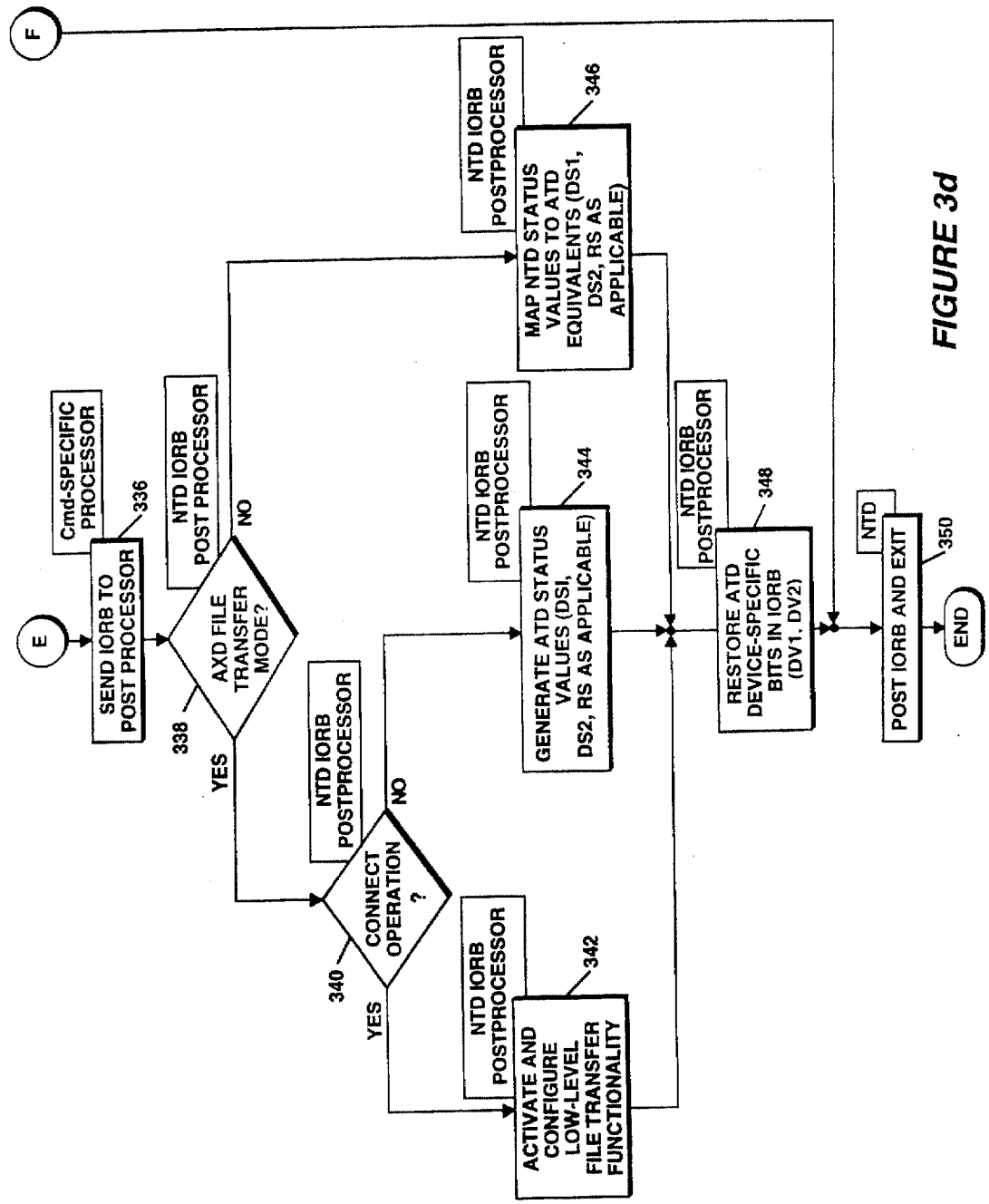

For certain ATD connection modes and types of IORBs, it becomes necessary to generate ATD status from status provided by the character processing functionality of provider 980 (block 344). This is true in AXD Filetran mode. As indicated in FIG. 3d, the post processor unit 914 determines if the mode of the NTD component 90 is AXD File Transfer Mode (AXD Filetran) (block 338). If it is and the operation being posted is a connect operation (block 340), then the post processor unit 914 activates the lower level character processing functionality added to the lower layer service provider 980. That is, if NTD component 90 was set to operate in the AXED FILETRAN submode and the connect request was successfully completed, then post processor 914 sets the appropriate value in a global indicator (ADX-FTC) for activating the added character processing functionality. Also, the appropriate conditions (i.e., bits) are set up according to the originally provided ATD device specific bits (e.g. a condition such as requiring receipt of an initial X-ON character for proper synchronization). Such functionality is enabled after the completion of the connect operation. For example, a connect request could involve a transfer of control character information. If the character processing functionality were to be enabled initially by preprocessor unit 904, it could possibly interfere with or cause incorrect processing of such control character information. Enabling it after the connect ensures maximum efficiency and reliability.

If the operation completed was not a connect, then the post processor unit 914 generates the appropriate ATD status values (block 344) based on status returned by the previously enabled character processing functionality of lower layer service provider 980. As indicated in FIG. 3d, the post processor unit 914 restores all the ATD DV1 and DV2 device specific word bits in the IORB obtained from the PMCB (block 346). In the case of a special system function such as a print command, no status conversion takes place since this operation is an NTD operation. Next, the IORB processor 912 posts the IORB back to the user application and exits (block 350).

From the above, it is seen how the NTD component 90 of the present invention is able to process requests received from user applications written for use with other driver software without requiring any changes to be made to such applications. It does this in a way which requires a minimum amount of changes to be made to the NTD component 90. For the most part, the invention requires the addition of preprocessing and post processing units and added functionality at the lower layer service provider. The Appendix should be consulted for further details concerning the implementations of preprocessor unit 904 and post processor unit 914.

While the preferred embodiment has been described relative to an emulation environment, the invention could also be used in a non-emulation environment. Also, the invention could also be used to emulate other driver software utilizing the same approach and adding necessary functionality to the different sections of the NTD component (e.g. new application module or new device profile).

-22-

APPENDICES

These Appendices include source listings which are subject to copyright protection. The copyright owner, Bull HN Information Systems Inc., has no objection to the facsimile reproduction by any one of the patent disclosure, as it appears in the Patent and Trademark Office patent files or records, but otherwise reserves all copyright rights in such listings whatsoever.

APPENDIX A - Preprocessor and Post Processor Components     Pages A-1 - A-30
APPENDIX B - Bit Masks     Pages B-1 - B-3

Page A-1

APPENDIX A
PREPROCESSOR AND POSTPROCESSOR COMPONENTS

```
/*
 * Name:    ntd_atda.c
 */ define <ntd_atda.h>
define <ntd_rct.h>
define <ntd_dv1.h> extern  unsigned short  axdft_mode;    /* indicator of axd file tran mode    */
extern  unsigned short  axdft_blksz;   /* configurable block size of xmit's  */
extern  unsigned short  axdft_boff;    /* buffer offset, writes with blocking */
extern  unsigned short  axdft_wrcode;  /* reentrant axd write routine code no. */
extern  struct AXSTR   *axdft_axptr;   /* saved off user xmit pdu            */

/*
 * Description:
 *
 * ZQNKII_preprocess_ATD_iorb
 *
 * This function is called by ZQNKIP subroutine to preprocess an iorb
 * running in ATD mode (ATD=IORB).
 *
 * 1) Save off iorb's DVS and DVS2 words
 *
 * 2) Determine what type of iorb it is. If the iorb is a connect iorb
 *    determine the ATD connection mode and store away in the RCT, otherwise
 *    obtain the ATD connect mode from the RCT.
 *
 * 3) Validate iorb function code is legal in ATD_MODE. If illegal, return
 *    inconsistant request (010C).
 *
 * 4) For those legal iorb's which require a translated DV1-DV2
 *    (Connect, disconnect,read, write), Determine ATD connection mode and
 *    type of iorb:
 *
 * o for each ATD connection mode:
 *
 *       TTY
 *       FIELD
 *       BLOCK
 *       ASPI
 *       AXD - raw
 *       AXD - filetran:
 *
 *    For each type of translatable iorb:
 *
 *       CONNECT:
 *       DISCONNECT
 *       READ:
 *       WRITE:
 *
 *          Translate function and ATD DVS(s) bits to NTD equivalents or
```

Page A-2

```
*           set error if untranslatable.
*
* 5) If status is good
*      copy origional DVS words into pmcb
*      modify iorb DVS words with translated versions
*      mark pmcb that translation occured.
*
*
* 6) Return status of operation to caller.
*
*
*
*
*
*ZQNKII_preprocess_ATD_iorb
*
* Usage:
*
* status = ZQNKII_preprocess_ATD_iorb(pmcbptr);
*
* PMCB *pmcbptr (pointer to PMCB structure)
*
* Functions called:
*
*
*
* Logic: validate DVS & DV2 for current device mode
*
* Pseudo-code or English high level procedure summary
*
*/
unsigned short
ZQNKII_preprocess_ATD_iorb(PMCBPTR pmcbptr)
  {                     /* Translate ATD IORB to NTD IORB   */
   struct RB    *iorbptr;   /* pointer to ATD IORB */
   struct RB    *ntd_iorb;  /* pointer to NTD's converted iorb */
   RCTPPTR      rctptr;     /* pointer to Resource Control Table */
   short        fc_index;   /* iorb function code        */
   unsigned short  atd_dv1; /* ATD iorb's dvs1 word       */
   unsigned short  atd_dv2; /* ATD iorb's dvs2 word       */
   DV1          dv1;        /* translated copy of i_dvs for NTD */
   DV2          dv2;        /* translated copy of i_dvs2 for NTD */
   unsigned long   mode;    /* mode of last atd connect    */
   unsigned short  cflag = 0;  /* 1 = copy iorb            */
   unsigned short  status = 0; /* return status            */ rctptr = pmcbptr->p_rctp;   /* get rct */
   iorbptr = pmcbptr->p_iorp;  /* get iorb from pmcb */
   atd_dv1 = iorbptr->rb_dvs;  /* get local copy of i_dvs */
   atd_dv2 = iorbptr->rb_dv2;  /* get local copy of i_dv2 */
   dv1.word = 0;               /* zero NTD DV1 word       */
   dv2.word = 0;               /* zero NTD DV2 word       */
   fc_index = iorbptr->rb_ct2 & 0x000f;   /* get iorb function code */
   mode = rctptr->r_atd & ATD_MODE_MASK;  /* ATD connect mode */
```

Page A-3

```
/*
 * Determine the ATD connection mode. If this is a connect iorb, then
 * update in the rct (r_atd.atdmode) this mode for future referencing.
 * Other iorbs need to know the connection mode as the DVS bits are
 * different per mode.
 */
  if (fc_index == FC_CONNECT)   /* if iorb is a connect  */
  {
        if (atd_dv1 & C_ADIAL)   /* AUTO DIAL (all modes) unsupported */
        {
          status = E_ARG;
        }
        if (atd_dv1 & C_BLOCK)
        {
           mode = ATD_BLOCK_MODE; /* block mode */
           rctptr->r_atd = (rctptr->r_atd & ~ATD_MODE_MASK) | mode;
        }
        else
        if (atd_dv1 & C_AXD)
        {
           if ((atd_dv1 & C_AXD_MODE_MSK) == AXD_RAW_VALUE)
           {
                mode = ATD_AXD_RMODE;   /* axd raw mode */
                rctptr->r_atd = (rctptr->r_atd & ~ATD_MODE_MASK) | mode;
           }
           else if ((atd_dv1 & C_AXD_MODE_MSK) == AXD_FIL_VALUE)
           {
                mode = ATD_AXD_FTMODE;  /* axd file tran mode */
                rctptr->r_atd = (rctptr->r_atd & ~ATD_MODE_MASK) | mode;
           }
           else   /* other modes of AXD are not supported yet */
           {
                status = E_ARG;
           }
        }
        else
        if (atd_dv1 & C_ASPI)
        {
           mode = ATD_ASPI_MODE;  /* ASPI mode   */
           rctptr->r_atd = (rctptr->r_atd & ~ATD_MODE_MASK) | mode;
        }
        else
           if ((iorbptr->rb_ct2 & mi_e) &&
                ((atd_dv2 & FLD_MODE_MASK) == FLD_MODE_VALUE))
        {
           mode = ATD_FIELD_MODE; /* field mode  */
           rctptr->r_atd = (rctptr->r_atd & ~ATD_MODE_MASK) | mode;
        }
        else
        {
           mode = ATD_TTY_MODE;   /* default is TTY mode */
           rctptr->r_atd = (rctptr->r_atd & ~ATD_MODE_MASK) | mode;
        }               /* end if atd_dv1 */
  }                     /* end if connect */
```

Page A-4

```c
/*
 * If no errors, screen function codes that ATD allows
 * Connect, disconnect, reads, and writes are flagged to be
 * translated and copied.
 */
    if (status == 0)
    {
        switch (fc_index)
        {
        case FC_CONNECT:        /* connect IORB      */
        case FC_DISCONNECT:     /* disconnect IORB   */
        case FC_READ:           /* read IORB         */
        case FC_WRITE:          /* write IORB        */
        case FC_DEFINE_FORM:    /* define form - field mode only */
            cflag = 1;          /* flag to translate */
            break;              /* end case:         */
        case FC_WAIT_ON_LINE:   /* wait online IORB  */
        case FC_Q_EVENT:        /* queued event (break) IORB */
        case FC_SWITCH:
            break;              /* allow these untranslated */
        case FC_ATV_EVENT:      /* HVX specific for PRTSCN */
        case FC_CAN_EVENT:      /* HVX specific for PRTSCN */
            status = PS_BY_PASS;  /* accept with no iorb translation */
            break;
        default:
            status = E_RQST;    /* unsupported iorb in atd_mode */
        }                       /* end switch        */
    }                           /* end if status = 0 */
/*                              */
/* Special for PRTSCN support in all ATD modes.   */
/*                              */
    if ((rctptr->r_stat & STAT_NVALID) &&
        (((unsigned short) rctptr->r_stat & STAT_NEVENT) == NTD_PS_QSTATE) &&
        (status == 0))
    {
        status = PS_BY_PASS;    /* bypass iorb translation below */
        cflag = 0;              /* no conversion     */
    }

/*
 * If iorb is to be translated (cflag), translate the DVS words for
 * each connection mode ATD supports. Set up the DVS1 word initially
 * with those bits common to both ATD and NTD via masking. Then, test
 * for and translate to NTD equivalents the other ATD bits.
 * Some connection modes also require setting up of DVS2 (field)
 */
    if ((status == 0) && (cflag != 0))
    {
        switch (mode)           /* ATD connection mode: */
        {
/* ATD TTY MODE <==> NTD MESSAGE MODE */
        case ATD_TTY_MODE:      /* TTY mode          */
            switch (fc_index)   /* switch on iorb type */
            {
```

Page A-5

```
            case FC_CONNECT:     /* connect IORB */
                dv1.word = atd_dv1 & C_COM_TTY; /* common bits */
                dv1.cconn.mode = MODE_MESSAGE; /* NTD MESSAGE mode */
                if (atd_dv1 & C_BUFM)  /* buffered mode = kab */
                {
                    dv1.mconn.bufr = 1; /* NTD equivalent   */
                }
                break;
            case FC_DISCONNECT: /* disconnect IORB */
                dv1.word = atd_dv1 & D_COM_TTY; /* all common */
                break;
            case FC_READ:       /* read IORB */
                dv1.word = atd_dv1 & R_COM_TTY; /* all common */
                break;
            case FC_WRITE:      /* write IORB */
                dv1.word = atd_dv1 & W_COM_TTY; /* all common */
                break;
            }           /* end switch(fc_index), TTY mode */
            break;
/* ATD BLOCK MODE <==> NTD BLOCK MODE */
        case ATD_BLOCK_MODE:    /* BLOCK mode */
            switch (fc_index)   /* switch on iorb type */
            {
            case FC_CONNECT:    /* connect IORB */
                dv1.word = atd_dv1 & C_COM_BLK; /* common bits */
                dv1.cconn.mode = MODE_BLOCK;   /* NTD BLOCK mode */
                if (atd_dv1 & C_SSUP)  /* space suppress   */
                {
                    dv1.bconn.ssup = 1; /* NTD equivalent   */
                }
                if (atd_dv1 & C_NROLL) /* no roll mode     */
                {
                    dv1.bconn.nrol = 1; /* NTD equivalent   */
                }
                break;
            case FC_DISCONNECT: /* disconnect IORB */
                dv1.word = atd_dv1 & D_COM_BLK; /* common bits */
                break;
            case FC_READ:       /* read IORB */
                dv1.word = atd_dv1 & R_COM_BLK; /* all common */
                break;
            case FC_WRITE:      /* write IORB */
                dv1.word = atd_dv1 & W_COM_BLK; /* common bits */
                break;
            }           /* end switch(fc_index), BLOCK mode */
            break;
/* ATD FIELD MODE <==> NTD FIELD MODE */
        case ATD_FIELD_MODE:    /* FIELD mode */
            switch (fc_index)   /* switch on iorb type */
            {
            case FC_CONNECT:    /* connect IORB */
                dv1.word = atd_dv1 & C_COM_FLD; /* common bits */
                dv1.cconn.mode = MODE_FIELD;   /* NTD FIELD mode */
                dv2.word = atd_dv2 & CDV2_COM_FLD;  /* common bits */
```

Page A-6

```
        if (atd_dv2 & CDV2_PRSMD_FLD)
        {
            dv2.word = dv2.word;      /* treat as no-op */
        }
        break;
    case FC_DISCONNECT:  /* disconnect IORB */
        dv1.word = atd_dv1 & D_COM_FLD;  /* common bits */
        dv2.word = atd_dv2 & DDV2_COM_FLD;   /* common bits */
        break;
    case FC_READ:      /* read IORB */
        dv1.word = atd_dv1 & R_COM_FLD;  /* common bits */
        dv2.word = atd_dv2 & RDV2_COM_FLD;   /* common bits */
        if (iorbptr->rb_hdr)
        {
            iorbptr->rb_con = iorbptr->rb_con - (iorbptr->rb_hdr << 8);
            pmcbptr->p_rctp->r_afmcpl = iorbptr->rb_con;
            pmcbptr->p_rctp->r_afmcph = iorbptr->rb_con +
                                        (iorbptr->rb_rng << 8);
        }
        else
        {
            pmcbptr->p_rctp->r_afmcpl = 0;
            pmcbptr->p_rctp->r_afmcph = 0;
        } break;
    case FC_WRITE:     /* write IORB */
        dv1.word = atd_dv1 & W_COM_FLD;  /* common bits */
        dv2.word = atd_dv2 & WDV2_COM_FLD;   /* common bits */
        if (atd_dv2 & WDV2_PGRAW_FLD)
        {
            dv2.cwrite.purg = 1;      /* NTD equivalent */
        } if (pmcbptr->p_rctp->r_afmcpl)
        {
            if ((iorbptr->rb_con > pmcbptr->p_rctp->r_afmcpl) &&
                (iorbptr->rb_con < pmcbptr->p_rctp->r_afmcph) &&
                ((iorbptr->rb_con & 0x00ff) ==
                 (pmcbptr->p_rctp->r_afmcpl & 0x00ff)))
            {
                iorbptr->rb_con = pmcbptr->p_rctp->r_afmcpl;
            }
        } break;
    case FC_DEFINE_FORM: /* define form */
        dv1.word = atd_dv1 & DF_DV1_COM_FLD;  /* common bits */
        break;
    }            /* end switch(fc_index), FIELD mode */
    break;
/* ATD  ASPI  MODE  <==>  NTD  PRINTER MODE */
    case ATD_ASPI_MODE:    /* ASPI mode */
        switch (fc_index)   /* switch on iorb type */
```

Page A-7

```
        {
        case FC_CONNECT:    /* connect IORB */
            dv1.word = atd_dv1 & C_COM_ASP; /* common bits */
            dv1.cconn.mode = MODE_PRINTER; /* NTD PRINTER mode */
            dv1.cconn.init = 1;/* initiate connection */
            break;
        case FC_DISCONNECT:  /* disconnect IORB */
            dv1.word = atd_dv1 & D_COM_ASP; /* common bits */
            break;
        case FC_READ:       /* read IORB */
            dv1.word = atd_dv1 & R_COM_ASP; /* common bits */
            if (atd_dv1 & R_ATTN)  /* attention reads */
            {
               dv1.pread.attr = 1; /* NTD equivalent    */
            }
            break;
        case FC_WRITE:      /* write IORB */
            dv1.word = atd_dv1 & W_COM_ASP; /* common bits */
            if (atd_dv1 & W_RETRY) /* retry write */
            {
               dv1.pwrite.rtry = 1;     /* NTD equivalent    */
            }
            if (atd_dv1 & W_LKCMD) /* lnk command write */
            {
               status = E_ARG;/* NO NTD equivalent !! */
            }
            break;
        }           /* end switch(fc_index), ASPI mode */
        break;

/* ATD AXD RAW MODE <==> NTD MESSAGE MODE*/
/* ATD AXD FILETRAN <==> NTD MESSAGE MODE*/ case ATD_AXD_RMODE:    /* ATD AXD raw mode */
        case ATD_AXD_FTMODE:   /* ATD AXD filetran mode */
        switch (fc_index)     /* switch on iorb type */
        {
        case FC_CONNECT:    /* connect IORB */
            dv1.word = atd_dv1 & C_COM_AXR; /* common bits */
            dv1.cconn.mode = MODE_MESSAGE; /* NTD MESSAGE mode */
            dv1.mconn.bufr = 1;         /* use key ahead buffer */
            if (mode == ATD_AXD_RMODE)    /* axd raw mode uses raw reads */
               dv1.mconn.iraw = 1;

if (atd_dv1 & C_ASNC) /* async read proc. */
            {
               dv1.word = dv1.word;     /* Accept and NO-OP    */
            }
            if (atd_dv1 & C_SINT) /* Solicit initial xfer */
            {
               dv1.word = dv1.word;     /* No-op now, process in ZQNKIO */
            }
            if (atd_dv1 & C_RIXON) /* Req. initial X-ON    */
            {
```

Page A-8

```
                    dv1.word = dv1.word;      /* No-op now, process in ZQNKIO */
                 }
                 break;
            case FC_DISCONNECT:  /* disconnect IORB */
                    dv1.word = atd_dv1 & D_COM_AXR; /* common bits */
                    if (atd_dv1 & D_SEOF)  /* send EOF seq. on disc */
                    {
                       dv1.mdisc.deof = 1; /* NTD equivalent    */
                    }
                    break;
            case FC_READ:       /* read IORB */
                    if (mode == ATD_AXD_RMODE)
                    {
                       dv1.word = atd_dv1 & R_COM_AXR;   /* common raw mode */
                       dv1.mread.iraw = 1;          /* use raw reads */
                    }
                    if (mode == ATD_AXD_FTMODE)
                       dv1.word = atd_dv1 & R_COM_AXF;   /* common file tran mode */
                    break;
            case FC_WRITE:      /* write IORB */
                    if (mode == ATD_AXD_RMODE)
                       dv1.word = atd_dv1 & W_COM_AXR;   /* common raw mode */
                    if (mode == ATD_AXD_FTMODE)
                       dv1.word = atd_dv1 & W_COM_AXF;   /* common file tran mode */
                    if (atd_dv1 & W_EWRIT) /* editied write   */
                    {
                       dv1.mwrite.ewrt = 1;     /* NTD equivalent */
                    }
                    if (atd_dv1 & W_SPEOF) /* post order EOF seq. */
                    {
                       dv1.mwrite.peof = 1;     /* NTD equivalent */
                    }
                    break;
            }            /* end switch(fc_index), AXD modes */
            break;       /* end case: AXD  modes           */

/* Programming error if it takes the default mode         */
            default:           /* unknown mode?? */
                status = E_ARG;       /* somethings wrong */
            }              /* end switch on mode   */
       }                    /* end if status == 0  */
/*
 * If no problems till this point, copy ATD dvs words to the PMCB for later
 * restoring. Reads, writes, connects and disconnects not related to PRTSCN
 * change the dvs words to an NTD equivalent.
 */
    if ((status == 0) || (status == PS_BY_PASS))
    {
         ntd_iorb = iorbptr;
         pmcbptr->p_atd_dv1 = atd_dv1;  /* save dvs words in pmcb */
         pmcbptr->p_atd_dv2 = atd_dv2;
         if (cflag)          /* reads,writes,conn,disc */
         {
            ntd_iorb->rb_dvs = dv1.word;
```

Page A-9

```
            if (ntd_iorb->rb_ct2 & mi_e)
            {
                    ntd_iorb->rb_dv2 = dv2.word;
            }
        }
        status = 0;         /* return status      */
    }
    ntd_iorb = iorbptr;     /* for darts in case of error */
/* DARTS trace point (TIP ID = 0xd301)   */
    ZQNEDT__darts_trace(0xd301, ntd_iorb, NULL, status, 0);
    return (status);
}                           /* ZQNKII__preprocess_atd_iorb */
```

```
/*
* Description:
*
* ZQNKIO__post_process_ATD_iorb
*
* This function is called by ZQNKIP subroutine to postprocess iorbs
* running in ATD mode (ATD=IORB). If the function code was a connect,
* disconnect, read, or write then this iorb was modified via the ATD
* preprocessor routine - ZQNKII. If modified, restore all ATD specific
* memory areas back to the IORB and perform post conversion processing.
* If PMCB already contains an error status, return that status, else
* return status of this call.
*
*
* Issues:
*
*
* Usage:
*
* status =  ZQNKIO__post_process_ATD_iorb(pmcbptr);
*
* PMCB *pmcbptr  (pointer to PMCB structure)
*
* Functions called:
*
*
*
*
*
*
* Logic:
*
* Pseudo-code or English high level procedure summary
*
* Description:
*
*
* 1) If iorb in PMCB is a translated version, then restore DV1 and DV2
*    words saved off in the PMCB.
*
* 2) Determine the ATD connection mode and type of iorb. For all possible
```

Page A-10

```
 *    combinations, allow for special returns in the iorb's field. This is
 *    to allow for future changes. It's purpose is to return the iorb as
 *    ATD would have in all modes.
 *
 *    TTY         CONNECT
 *    FIELD       DISCONNECT
 *    BLOCK       READ
 *    ASPI        WRITE
 *    AXD,raw     WAIT ON LINE
 *                QUEUED EVENT (BREAK)
 *                DEFINE FORM
 *
 * 3) Preserve PMCB error when non-zero:
 *
 *    If (pmcb->p_err) --- Return(pmcb->p_err)
 *    else            --- Return status of this operation to caller.
 *    endif
 *
 *
 *
 *
 */
unsigned short
ZQNKIO__post_process_ATD_iorb(PMCBPTR pmcbptr)
{                      /* Translate ATD IORB to NTD IORB   */
    struct RB    *iorbptr;   /* pointer to real IORB */
    struct RB    *ntd_iorb;  /* pointer to converted NTD iorb */
    RCTPPTR      rctptr;    /* pointer to Resource Control Table */
    short        fc_index;  /* iorb function code         */
    unsigned long  mode;    /* mode of last atd connect   */
    unsigned short status = 0; /* return status           */ rctptr = pmcbptr->p_rctp;    /* get rct */
    iorbptr = pmcbptr->p_iorp;   /* get translated iorb */
    fc_index = iorbptr->rb_ct2 & 0x000f;     /* get iorb funct. code */
    mode = rctptr->r_atd & ATD_MODE_MASK;    /* ATD connect mode */
    iorbptr->rb_dvs = pmcbptr->p_atd_dv1;    /* restore orig. dvs words */
    if (iorbptr->rb_ct2 & mi_e)
    {
        iorbptr->rb_dv2 = pmcbptr->p_atd_dv2;
    }

/*
 * NTD may not have updated iorb fields exactly as ATD would. So, for
 * all possible ATD connection modes supported and all possible iorb
 * function codes: make any final NTD=>ATD translations
 */
    iorbptr = pmcbptr->p_iorp;   /* reload true iorb    */
    if (status == 0)             /* if no errors        */
    {
        switch (mode)            /* ATD connection mode:  */
        {
/* ATD TTY MODE <==> NTD MESSAGE MODE */
        case ATD_TTY_MODE:       /* TTY mode   */
            switch (fc_index)    /* switch on iorb type */
```

Page A-11

```
        {
        case FC_CONNECT:        /* connect IORB */
        case FC_DISCONNECT:     /* disconnect IORB */
        case FC_READ:           /* read IORB */
        case FC_WRITE:          /* write IORB */
        case FC_WAIT_ON_LINE:   /* wait online IORB */
        case FC_DEFINE_FORM:    /* define form IORB */
        case FC_Q_EVENT:        /* queued event (break) IORB */
        case FC_SWITCH:
                break;          /* end of case */
        }                       /* end switch(fc_index), TTY mode */
        break;
/* ATD BLOCK MODE <==> NTD BLOCK MODE */
        case ATD_BLOCK_MODE:    /* BLOCK mode */
        switch (fc_index)       /* switch on iorb type */
        {
        case FC_CONNECT:        /* connect IORB */
        case FC_DISCONNECT:     /* disconnect IORB */
        case FC_READ:           /* read IORB */
        case FC_WRITE:          /* write IORB */
        case FC_WAIT_ON_LINE:   /* wait online IORB */
        case FC_DEFINE_FORM:    /* define form IORB */
        case FC_Q_EVENT:        /* queued event (break) IORB */
        case FC_SWITCH:
                break;          /* end of case */
        }                       /* end switch(fc_index), BLOCK mode */
        break;
/* ATD FIELD MODE <==> NTD FIELD MODE */
        case ATD_FIELD_MODE:    /* FIELD mode */
        switch (fc_index)       /* switch on iorb type */
        {
        case FC_CONNECT:        /* connect IORB */
        case FC_DISCONNECT:     /* disconnect IORB */
        case FC_READ:           /* read IORB */
        case FC_WRITE:          /* write IORB */
        case FC_WAIT_ON_LINE:   /* wait online IORB */
        case FC_DEFINE_FORM:    /* define form IORB */
        case FC_Q_EVENT:        /* queued event (break) IORB */
        case FC_SWITCH:
                break;          /* end of case */
        }                       /* end switch(fc_index), FIELD mode */
        break;
/* ATD ASPI MODE <==> NTD PRINTER MODE */
        case ATD_ASPI_MODE:     /* ASPI mode */
        switch (fc_index)       /* switch on iorb type */
        {
        case FC_CONNECT:        /* connect IORB */
        case FC_DISCONNECT:     /* disconnect IORB */
        case FC_READ:           /* read IORB */
        case FC_WRITE:          /* write IORB */
        case FC_WAIT_ON_LINE:   /* wait online IORB */
        case FC_DEFINE_FORM:    /* define form IORB */
        case FC_Q_EVENT:        /* queued event (break) IORB */
        case FC_SWITCH:
```

Page A-12

```
            break;         /* end of case */
        }              /* end switch(fc_index), ASPI mode */
        break;
/* ATD AXD RAW MODE <==> NTD MESSAGE MODE */
    case ATD_AXD_RMODE:    /* ATD AXD raw mode */
        switch (fc_index)   /* switch on iorb type */
        {
        case FC_CONNECT:     /* connect IORB */
        case FC_DISCONNECT:  /* disconnect IORB */
        case FC_READ:        /* read IORB */
        case FC_WRITE:       /* write IORB */
        case FC_WAIT_ON_LINE: /* wait online IORB */
        case FC_DEFINE_FORM: /* define form IORB */
        case FC_Q_EVENT:     /* queued event (break) IORB */
        case FC_SWITCH:
            break;         /* end of case */
        }
        break;         /* end case: AXD raw mode */
/* ATD AXD FILETRAN <==> NTD MESSAGE MODE */
    case ATD_AXD_FTMODE:   /* ATD AXD FileTran mode */
        switch (fc_index)   /* switch on iorb type */
        {
        case FC_CONNECT:     /* connect (successful) IORB */
            axdft_mode = AXD_FTC;  /* set AXD filetran mode global ind. */
            axdft_boff = 0;
            if (iorbptr->rb_dvs & C_SINT) /* send initial XON? */
                axdft_mode |= AXD_XON_SND; /* yes */
            if (iorbptr->rb_dvs & C_RIXON) /* wait for XON to be rcv'd? */
                axdft_mode |= AXD_XOFF_RCV; /* yes, block xmt till XON rcv'd */
            break;
        case FC_DISCONNECT:  /* disconnect IORB */
            axdft_mode = 0;  /* reset global indicators */
            axdft_boff = 0;
            break;
        case FC_READ:        /* read IORB */
            switch (pmcbptr->p_err)  /* setup return status word */
            {
            case E_GOOD:
                if (pmcbptr->p_st & S_INTR)
                    iorbptr->rb_st = (AXD_ST_STC | AXD_ST_BRK | AXD_ST_NZR);
                else
                    iorbptr->rb_st =
                        (AXD_ST_IOC | AXD_ST_STC | AXD_ST_NE | AXD_ST_NZR);
                break;
            case E_EOF:
                iorbptr->rb_st = (AXD_ST_STC | AXD_ST_EOF);
                ZQNKQC_clear_device_queue(rctptr, E_EOF, pmcbptr->p_st, 1);
                break;
            case E_DVDS:
                iorbptr->rb_st = (AXD_ST_STC | AXD_ST_DSS);
                break;
            case E_DVTO:
                iorbptr->rb_st = (AXD_ST_STC | AXD_ST_TO);
                break;
```

Page A-13

```
                default:
                    iorbptr->rb_st |= (AXD_ST_STC | AXD_ST_FAT);
                    break;
                }
                break;
            case FC_WRITE:      /* write IORB */
                switch (pmcbptr->p_err)     /* setup return status word */
                {
                case E_GOOD:
                    if (pmcbptr->p_st & S_INTR)
                        iorbptr->rb_st = (AXD_ST_STC | AXD_ST_BRK | AXD_ST_NZR);
                    else
                        iorbptr->rb_st = (AXD_ST_IOC | AXD_ST_STC | AXD_ST_NE);
                    break;
                case E_DVDS:
                    iorbptr->rb_st = (AXD_ST_STC | AXD_ST_DSS);
                    break;
                case E_DVTO:
                    iorbptr->rb_st = (AXD_ST_STC | AXD_ST_TO);
                    break;
                default:
                    iorbptr->rb_st |= (AXD_ST_STC | AXD_ST_FAT);
                    break;
                }
                break;

case FC_WAIT_ON_LINE:  /* wait online IORB */
            case FC_DEFINE_FORM:   /* define form IORB */
            case FC_Q_EVENT:       /* queued event (break) IORB */
            case FC_SWITCH:
                break;          /* end case   */
            }                   /* end switch (fc_index)  */
            break;              /* end case AXD Filetran mode */
        }                       /* end switch on ATD mode */
    }                           /* end if status = 0 */
    /* DARTS trace point (TIP ID = 0xd302)  */
    ZQNEDT__darts_trace(0xd302, iorbptr, NULL, 0, 0);
    if (pmcbptr->p_err)
    {
        return (pmcbptr->p_err);
    }
    else
    {
        return (status);
    }
}                       /* ZQNKIO__post_process_atd_iorb */
```

Page A-14

```
/*
 * Name:    ntd_atda.h
 */
/*
 *          ATD Connect DVS bit masks:
 *
 *
 *              TTY     BLOCK   ASPI    FIELD   AXD
 *
 *
 *all bits mask: 3005    28C1    2001    3001    30C1
 * unsupported:  2000    2000    2000    2000    2000
 * same as NTD:  1001    0801    0001    1001    0001
 *  different:   0004    00C0    0000    0000    10C0
 *
 * Mappable Exceptions:
 *
 *   TTY mode  0004 ==> 0100
 *   Block mode 0080 ==> 0400
 *   Block mode 0040 ==> 0200
 *     AXD mode 0080 ==> 0002
 *     AXD mode 0040 ==> 0000  (accept and no-op as has no meaning)
 *     AXD mode 1000 ==> 0000  (accept and no-op: NTD can handle mult reads)
 *
 */
#define FLD_MODE_MASK  0x0010     /* i_dv2 mask for field  mode */
#define FLD_MODE_VALUE 0x0000     /* masked value for field mode */
#define AXD_RAW_VALUE  0x0000     /* i_dv1, AXD raw mode value   */
#define AXD_TER_VALUE  0x0100     /* i_dv1, AXD terminal mode value */
#define AXD_FIL_VALUE  0x0300     /* i_dv1, AXD File tran mode value */
#define AXD_PRT_VALUE  0x0400     /* i_dv1, AXD printer mode value */
#define C_BLOCK        0x8000     /* use block mode */
#define C_AXD          0x4000     /* use AXD mode  */
#define C_ADIAL        0x2000     /* use auto dial */
#define C_NOBEL        0x1000     /* suppress bells (FLD)   */
#define C_ASNC         0x1000     /* process reads async.(AXD) */
#define C_NCW          0x0800     /* DON'T include ctrl word */
#define C_AXD_MODE_MSK 0x0700     /* mode of AXD mask       */
#define AXD_RAW        0          /* 0: raw mode of axd */
#define AXD_TERM       1          /* 1: terminal mode of axd */
/* 2: rfu      */
#define AXD_FIL        3          /* 3: Filtran  mode of axd */
#define AXD_PRT        4          /* 4: Printer  mode of axd */
/* 5-7: rfu    */
#define C_SSUP         0x0080     /* use space suppression */
#define C_SINT         0x0080     /* solicit initial transfer (AXD) */
#define C_NROLL        0x0040     /* use no roll  */
#define C_RIXON        0x0040     /* require initial X-ON (AXD)   */
#define C_ASPI         0x0020     /* use aspi mode */
#define C_BUFM         0x0004     /* use buffered mode */
#define C_INIT         0x0002     /* 1: init, 0: acpt (HVX only) connect */
#define C_LOGC         0x0001     /* LOGICAL connect */
#define C_COM_TTY      (C_NOBEL | C_INIT | C_LOGC)     /* Comm conn TTY */
```

Page A-15

```
#define C_COM_BLK    (C_NCW   | C_INIT | C_LOGC)    /* Comm conn BLK */
#define C_COM_FLD    (C_NOBEL | C_INIT | C_LOGC)    /* Comm conn FLD */
#define C_COM_ASP    ( 0x0000 | C_INIT | C_LOGC)    /* Comm conn ASPI */
#define C_COM_AXR    ( 0x0000 | C_INIT | C_LOGC)    /* Comm conn AXD RAW */
/*
 *
 *       Disconnect DVS bit masks:
 *
 *
 *       TTY    BLOCK   ASPI    FIELD   AXD
 *
 *
 * all bits mask: 0003   0003   0003   0003   0007
 * unsupported:   0000   0000   0000   0000   0000
 * same as NTD:   0003   0003   0003   0003   0003
 * different:     0000   0000   0000   0000   0004
 *
 * Mappable Exceptions:
 *
 *    AXD mode  0004 ==> 4000
 *
 */
#define D_SEOF       0x0004    /* EOF sequence before disconnect */
#define D_WAIT       0x0002    /* wait on iorbs before disconnecting */
#define D_LOGD       0x0001    /* LOGICAL disconnect */
#define D_COM_TTY    (D_WAIT | D_LOGD)  /* Comm disc TTY */
#define D_COM_BLK    (D_WAIT | D_LOGD)  /* Comm disc BLK */
#define D_COM_FLD    (D_WAIT | D_LOGD)  /* Comm disc FLD */
#define D_COM_ASP    (D_WAIT | D_LOGD)  /* Comm disc ASPI */
#define D_COM_AXR    (D_WAIT | D_LOGD)  /* Comm disc AXD RAW */
/*
 *
 *       Read DVS bit masks:
 *
 *
 *       TTY    BLOCK   ASPI    FIELD   AXD
 *
 *
 * all bits mask: 0038   8058   8000   0020   0038
 * unsupported:   0000   0000   0000   0000   0000
 * same as NTD:   0038   8058   0000   0020   0038
 * different:     0000   0000   8000   0000   0000
 *
 * Mappable Exceptions:
 *
 *    ASPI mode  8000 ==> 2000
 *
 */
#define R_PURGE      0x8000    /* purge reads back(BLK) */
#define R_ATTN       0x8000    /* read attention  (ASPI) */
#define R_SUPMG      0x0040    /* Supervisory message */
#define R_ECHO       0x0020    /* echo data */
#define R_SPOLF      0x0010    /* send post order <lf> */
#define R_NPOCR      0x0008    /* DON'T send post order <cr> */
```

Page A-16

```
#define R_COM_TTY  (R_ECHO | R_SPOLF | R_NPOCR)           /* Comm - TTY */
#define R_COM_BLK  (R_PURGE | R_SUPMG | R_SPOLF | R_NPOCR) /* Comm - BLK */
#define R_COM_FLD  R_ECHO                                  /* Comm - FLD */
#define R_COM_ASP  0x0000                                  /* Comm - ASPI */
#define R_COM_AXR  (R_ECHO | R_SPOLF | R_NPOCR)           /* Comm - AXD raw */
#define R_COM_AXF  R_ECHO                                  /* Comm - AXD file tran */
/*
 *
 *
 *     Write DVS bit masks:
 *
 *
 *        TTY   BLOCK  ASPI  FIELD  AXD
 *
 *
 * all bits mask: 291C  9BD8  481B  0180  3B18
 * unsupported:   0000  0000  4000  0000  0000
 * same as NTD:   2918  9BD8  081A  0180  0B18
 *   different:   0004  0000  0001  0000  3000
 *
 * Mappable Exceptions:
 *
 *   ASPI mode  0001 ==> 0100
 *   AXD  mode  2000 ==> 0001
 *   AXD  mode  1000 ==> 0004
 * Message mode 0004 ==> xxxx (no equiv NTD bit, ref. in msg am)
 *
 */
#define W_PURGE   0x8000   /* purge outstanding writes */
#define W_LKCMD   0x4000   /* data link cmd in buffer */
#define W_CKOFF   0x2000   /* check for offline conditions (TTY) */
#define W_EWRIT   0x2000   /* edited write, preceed with DLE (AXD) */
#define W_PREDW   0x1000   /* preemtive data write (BLOCK) */
#define W_SPEOF   0x1000   /* send post order EOF seq. (AXD) */
#define W_NCTRB   0x0800   /* No ctrl byte present    */
#define W_KLCK    0x0200   /* keep keyboard locked after write (BLK) */
#define W_STSP    0x0200   /* suppress trailing spaces (AXD) */
#define W_NBRK    0x0100   /* DON'T interrupt write upon BREAK */
#define W_NSACK   0x0080   /* Supervisory ACK not required */
#define W_SUPMG   0x0040   /* Supervisory write       */
#define W_POLF    0x0010   /* send post order <LF>    */
#define W_NPOCR   0x0008   /* send NO post order <cr> */
#define W_CBF     0x0004   /* control byte format     */
#define W_SDC4    0x0002   /* Command write - send DC4 at EOM */
#define W_RETRY   0x0001   /* retry of failed write   */
#define W_COM_TTY (W_CKOFF | W_NCTRB | W_NBRK | W_POLF | W_NPOCR)
#define W_COM_BLK (W_PURGE | W_PREDW | W_NCTRB | W_KLCK | W_NBRK |\
                   W_NSACK | W_SUPMG | W_POLF | W_NPOCR)
#define W_COM_FLD (W_NBRK | W_NSACK )
#define W_COM_ASP (W_NCTRB | W_POLF | W_NPOCR | W_SDC4)
#define W_COM_AXR (W_NCTRB | W_STSP | W_NBRK | W_POLF | W_NPOCR)
#define W_COM_AXF (W_NCTRB | W_STSP | W_NBRK | W_POLF | W_NPOCR)
/*
 *
```

Page A-17

```
*
*       Field Mode DVS2 bit masks:
*
*       Connect Disconnect Read   Write
*
*
* all bits mask:  4EEC   0000   E10F   003F
* unsupported:    0000   0000   0000   0000
* same as NTD:    4E8C   0000   E10F   000F
*   different:   0060   0000   0000   0030
*
* field mode connect, DVS2 bits 0060 ==> treat as no-op
* field mode write,   DVS2 bits 0030 ==> 0010 (NTD equivalent)
*
*/
#define CDV2_TRMRD_FLD   0x4000   /* Connect DV2 - terminate read on key */
#define CDV2_VFNSP_FLD   0x0800   /* Connect DV2 - VFN support */
#define CDV2_FVSET_FLD   0x0600   /* Connect DV2 - field validation set */
#define CDV2_NOBRK_FLD   0x0080   /* Connect DV2 - disable break       */
#define CDV2_PRSMD_FLD   0x0060   /* Connect DV2 - Presentation (VIP-SDP) */
#define CDV2_UMCOF_FLD   0x0008   /* Connect DV2 - allow cursor out of field */
#define CDV2_UKAB_FLD    0X0004   /* Connect DV2 - use key ahead buffer */
#define RDV2_PGKAB_FLD   0x8000   /* Read DV2 - Purge key ahead buffer */
#define RDV2_INSFT_FLD   0x4000   /* Read DV2 - Implied numeric shift */
#define RDV2_IFLDD_FLD   0x2000   /* Read DV2 - Integrated field descriptor */
#define RDV2_OVCOF_FLD   0x0100   /* Read DV2 - Override out of fld capacity */
#define RDV2_SPBEL_FLD   0X0008   /* Read DV2 - send preorder bell */
#define RDV2_SPERS_FLD   0x0004   /* Read DV2 - send preorder erase line */
#define RDV2_ICONC_FLD   0x0003   /* Read DV2 - I_CON control */
#define WDV2_PGRAW_FLD   0x0030   /* Write DV2 - purge reads and writes */
#define WDV2_SPBEL_FLD   0X0008   /* Write DV2 - send preorder bell    */
#define WDV2_SPERS_FLD   0x0004   /* Write DV2 - send preorder erase line */
#define WDV2_ICONC_FLD   0x0003   /* Write DV2 - I_CON control */
#define CDV2_COM_FLD     0x4e8c   /* Connect   DV2 - common bits (ATD-NTD) */
#define DDV2_COM_FLD     0x0000   /* Disconnect DV2 - common bits (ATD-NTD) */
#define RDV2_COM_FLD     0Xe10f   /* Read      DV2 - common bits (ATD-NTD) */
#define WDV2_COM_FLD     0X000f   /* Write     DV2 - common bits (ATD-NTD) */
/*                                */
/*    Field Mode Define Form DVS common bits       */
/*                                */
#define DF_DV1_COM_FLD   0x0000   /* MBZ for NTD, ATD don't care */
/*                        */
/*    ATD PRTSCN uses NTD PRTSCN support:          */
/*                        */
#define NTD_PS_QSTATE    0x0000   /* NTD r_stat, bits 0x0f00 f=0: PRTSCN */
#define PS_BY_PASS       0x0001   /* PRTSCN: Bypass iorb translation   */
/*                        */
/* Defines for global variables                   */
/*                        */
/* axdft_mode:      WORD                    */
/*                        */
#define AXDFT_MODE_MASK  0x0003   /* Mask of all bits, values follow   */
#define AXD_FTC          0x0001   /* Connected in AXD file Tran mode   */
#define AXD_FTWH         0x0002   /* Entered AXD file tran write handler */
```

Page A-18

```c
#define AXD_HIDE_RCV    0X0004  /* HIDE char received */
#define AXD_XOFF_RCV    0x0008  /* XOFF char recieved */
#define AXD_XOFF_SND    0x0010  /* send XOFF, tell other side stop sending*/
#define AXD_XON_SND     0x0020  /* send XON, tell other side OK to send */
#define AXD_XOFF_SENT   0x0040  /* XOFF sent out, waiting on KAB to drain */
#define AXD_BUF_FULL    0x0080  /* iorb buffer at max, no EOR rcv'd yet */
/*                                                                      */
/* AXD File Tran mode uses blocking in writes                           */
/*                                                                      */
#define AXD_BLK_SZ  0x0100      /* blocking size                        */
/*                                                                      */
/* IORB status word (I_ST) returns                                      */
/*                                                                      */
#define AXD_ST_IOC  0x4000      /* i-o complete     */
#define AXD_ST_OVR  0x2000      /* rcv overrun      */
#define AXD_ST_STC  0x1000      /* status complete  */
#define AXD_ST_TCM  0x0700      /* termination code mask*/
#define AXD_ST_NE   0x0000      /* no errros term. value*/
#define AXD_ST_TO   0x0100      /* timeout occurred */
#define AXD_ST_EOF  0x0400      /* EOF recieved     */
#define AXD_ST_BRK  0x0500      /* BREAK recieved   */
#define AXD_ST_NZR  0x0020      /* non-zero residual rng*/
#define AXD_ST_DSS  0x0010      /* Data set status chg */
#define AXD_ST_FAT  0x0001      /* fatal error      */
/*                                                                      */
/* AXD File Tran mode default control character defines */
/*                                                                      */
#define AXD_CTL_EOR     0x0d    /* end of record = <cr> */
#define AXD_CTL_HIDE    0x10    /* hide (escape) char */
#define AXD_CTL_XOFF    0x11    /* suspend character */
#define AXD_CTL_XON     0x13    /* resume character */
#define AXD_CTL_EOF     0x1c    /* end of file */
#define AXD_CTL_PAD     0x7f    /* pad character <del> */
```

Page A-19

```c
/*
 * Name:    ntd_rct.h
 * Purpose: RESOURCE CONTROL TABLE TEMPLATE
 */

/*         RESOURCE CONTROL TABLE              */ unsigned long  r_atd;    /* defines for atd accommodator   */
define ATD_OPT_MASK  0x0000000f /* r_atd mask for clm optional modes */
#define A_IORB 0x00000001      /* iorb (cb) accommodation (bit 31)  */
#define A_CB   0x00000002      /* cb accommodation       (bit 30)  */
#define ATD_MODE_MASK 0x000f0000 /* r_atd mask for ATD connection mode */
#define ATD_TTY_MODE  0x00000000 /* r_atd value for TTY mode   */
#define ATD_BLOCK_MODE 0x00010000 /* r_atd value for BLOCK mode  */
#define ATD_FIELD_MODE 0x00020000 /* r_atd value for FIELD mode  */
#define ATD_ASPI_MODE  0x00030000 /* r_atd value for ASPI mode   */
#define ATD_AXD_RMODE  0x00040000 /* r_atd value for ATD AXD raw mode */
#define ATD_AXD_FTMODE 0x00050000 /* r_atd value for ATD AXD file tran mode */
```

Page A-20

```c
/*
 * Name:    ntd_dv1.h
 * Purpose: I_DVS bit definitions
 */ union dv1
{
    unsigned short  word;       /* Access it as a word      */ struct
    {                           /* Connect common           */
        unsigned    pterm:1;    /* PTERM (switching back to HVS) */
        unsigned:   7;          /* Bits 1 to 7 not common   */
        unsigned    mode:4;     /* Encoded mode values      */
        unsigned    mlrn:1;     /* Connect in master LRN proc */
        unsigned    sris:1;     /* Send an RIS              */
        unsigned    init:1;     /* Initiate type connect    */
        unsigned    log:1;      /* logical: Don't establish cnect */
    }           cconn;

struct
    {                           /* Disconnect common        */
        unsigned    pterm:1;    /* PTERM (switching to XC)  */
        unsigned:   13;         /* Bits 1 to 13 not common  */
        unsigned    nabt:1;     /* Do not abort outstanding ordrs */
        unsigned    nrls:1;     /* Do not release connection */
    }           cdisc;

struct
    {                           /* Read common              */
        unsigned    abrt:1;     /* Abort all outstanding orders */
        unsigned    evnr:1;     /* Event notification proc read */
        unsigned:   14;         /* Bits 2 to 15 not common  */
    }           cread;

struct
    {                           /* Write common             */
        unsigned    abrt:1;     /* Abort all outstanding orders */
        unsigned    evnw:1;     /* Event notification proc write */
        unsigned:   14;         /* Bits 2 to 15 not common  */
    }           cwrite;

struct
    {                           /* Queued event notif.      */
        unsigned    cantyp:1;   /* Cancel for encoded event type */
        unsigned    canall:1;   /* Cancel all/NOT just the last */
        unsigned:   2;          /* Bits 2 & 3 RFU           */
        unsigned    eeqt:4;     /* encoded queued event type: 0 =
                                 * Break (interrupt) 1-F = RFU */
        unsigned:   8;          /* Bits 8-15 RFU            */
    }           qevent;
    struct
    {                           /* ActiVate non-queued event not. */
        unsigned:   4;          /* Bits 0-3 RFU             */
```

Page A-21

```
        unsigned    eent:4;  /* encoded non-queued event type: 0 =
                              * Print Screen 1-F =  RFU          */
        unsigned:   8;    /* Bits 8-15 RFU          */
}       avevent;
struct
{                          /* CaNcel non-queued event notif. */
        unsigned    cantyp:1;/* Cancel Activate event IORB/NOT signal
                              * termination for encoded event type */
        unsigned:   3;    /* Bits 0-3 RFU          */
        unsigned    eent:4;  /* encoded non-queued event type: 0 =
                              * Print Screen 1-F =  RFU          */
        unsigned:   8;    /* Bits 8-15 RFU          */
}       cnevent;

struct
{                          /* Admin mode read       */
        unsigned:   4;    /* Bits 0 to 3 not defined here */
        unsigned    eent:4;  /* Encoded event notification type */
        unsigned    niwr:1;  /* Do not inhibit writes    */
        unsigned    peor:1;  /* Post on end of range     */
        unsigned    osrp:1;  /* Override suspend/resume protcol */
        unsigned:   5;     /* Bits 11 to 15 not defined here */
}       aread;

struct
{                          /* Admin mode write      */
        unsigned:   4;    /* Bits 0 to 3 not defined here */
        unsigned    eent:4;  /* Encoded event notification type */
        unsigned:   8;    /* Bits 8 to 15 not defined here */
}       awrite;

struct
{                          /* Message mode connect  */
        unsigned:   2;    /* Bits 0 to 1 not defined here */
        unsigned    kerm:1;  /* Kermit connect       */
        unsigned    bsup:1;  /* Bell suppress        */
        unsigned    sraw:1;  /* Raw input selectable in reads */
        unsigned    vtxt:1;  /* Videotext processing */
        unsigned    iraw:1;  /* Input is raw (no edit) */
        unsigned    bufr:1;  /* Buffered mode        */
        unsigned:   8;    /* Bits 8 to 15 not defined here */
}       mconn;

struct
{                          /* Message mode disconnect   */
        unsigned:   1;    /* Bit 0 not defined here */
        unsigned    deof:1;  /* Send end of file on disconnect */
        unsigned:   14;   /* Bits 2 to 15 not defined here */
}       mdisc;

struct
{                          /* Message mode read     */
        unsigned:   3;    /* Bits 0 to 2 not defined here */
        unsigned    pekb:1;  /* Post on emptying key ahead buf */
```

Page A-22

```c
        unsigned:  2;      /* Bits 4 to 5 not defined here  */
        unsigned   iraw:1; /* Input is raw (not edited)     */
        unsigned   pkah:1; /* Purge keyahead buffer         */
        unsigned   eche:1; /* Echo character/Echo constant  */
        unsigned:  1;      /* Bit 9 not defined here        */
        unsigned   echo:1; /* Echo input                    */
        unsigned   polf:1; /* Send post order linefeed      */
        unsigned   npcr:1; /* No post order carriage return */
        unsigned:  3;      /* Bits 13 to 15 not defined here */
}         mread;

struct
{                   /* Message mode write       */
        unsigned:  4;      /* Bits 0 to 4 not defined here  */
        unsigned   ncbt:1; /* No control byte present       */
        unsigned   tsts:1; /* No trail space if p/o c/r     */
        unsigned:  1;      /* Bit 6 not defined here        */
        unsigned   nbrk:1; /* No stop on interrupt          */
        unsigned:  3;      /* Bits 8 to 10 not defined here */
        unsigned   polf:1; /* Send post order linefeed      */
        unsigned   npcr:1; /* No post order carriage return */
        unsigned   peof:1; /* Cmd write - Post order EOF    */
        unsigned   pint:1; /* Cmd write - Post order interrt */
        unsigned   ewrt:1; /* Edited write                  */
}         mwrite;

struct
{                   /* Field mode connect       */
        unsigned:  3;      /* Bits 0 to 2 not defined here  */
        unsigned   bsup:1; /* Bell suppress                 */
        unsigned:  12;     /* Bits 4 to 15 not defined here */
}         fconn;

struct
{                   /* Field mode read          */
        unsigned:  8;      /* Bits 0 to 7 not defined here  */
        unsigned   eche:1; /* Echo character/Echo constant  */
        unsigned   supr:1; /* Supervisory read              */
        unsigned   echo:1; /* Echo input                    */
        unsigned:  5;      /* Bits 11 to 15 not defined here */
}         fread;

struct
{                   /* Field mode write         */
        unsigned:  7;      /* Bits 0 to 6 not defined here  */
        unsigned   nbrk:1; /* No stop on interrupt          */
        unsigned   nack:1; /* No supervisory ACK            */
        unsigned   supw:1; /* Supervisory write             */
        unsigned:  6;      /* Bits 10 to 15 not defined here */
}         fwrite;

struct
{                   /* Block mode connect       */
        unsigned:  4;      /* Bits 0 to 3 not defined here  */
```

Page A-23

```c
        unsigned   ncwd:1;  /* Do not include control word  */
        unsigned   ssup:1;  /* Space suppression            */
        unsigned   nrol:1;  /* No roll                      */
        unsigned:  9;       /* Bits 7 to 15 not defined here */
}          bconn;

struct
{                          /* Block mode read              */
        unsigned:  9;       /* Bits 0 to 8 not defined here */
        unsigned   supr:1;  /* Supervisory read             */
        unsigned:  1;       /* Bit 10 not defined here      */
        unsigned   polf:1;  /* Send post order linefeed     */
        unsigned   npcr:1;  /* No post order carriage return */
        unsigned:  3;       /* Bits 12 to 15 not defined here */
}          bread;

struct
{                          /* Block mode write             */
        unsigned:  3;       /* Bits 0 to 2 not defined here */
        unsigned   prew:1;  /* Preemptive write             */
        unsigned   ncbt:1;  /* No control byte present      */
        unsigned   rfu:1;   /* RFU                          */
        unsigned   tetb:1;  /* Terminate with ETB           */
        unsigned   nbrk:1;  /* No stop on interrupt         */
        unsigned   nack:1;  /* No supervisory ACK           */
        unsigned   supw:1;  /* Supervisory write            */
        unsigned:  1;       /* Bit 10 not defined here      */
        unsigned   polf:1;  /* Send post order linefeed     */
        unsigned   npcr:1;  /* No post order carriage return */
        unsigned:  3;       /* Bits 13 to 15 not defined here */
}          bwrite;

struct
{                          /* Printer mode connect         */
        unsigned:  2;       /* Bits 0 to 1 not defined here */
        unsigned   ntrn:1;  /* Non transparent mode         */
        unsigned:  13;      /* Bits 3 to 15 not defined here */
}          pconn;

struct
{                          /* Printer mode read            */
        unsigned:  2;       /* Bits 0 to 1 not defined here */
        unsigned   attr:1;  /* Attention status read        */
        unsigned:  13;      /* Bits 3 to 15 not defined here */
}          pread;

struct
{                          /* Printer mode write           */
        unsigned:  4;       /* Bits 0 to 3 not defined here */
        unsigned   ncbt:1;  /* No control byte present      */
        unsigned   tsts:1;  /* No trail space if p/o c/r    */
        unsigned:  1;       /* Bit 6 not defined here       */
        unsigned   rtry:1;  /* Retry write                  */
        unsigned:  2;       /* Bits 8 and 9 not defined here */
```

Page A-24

```c
        unsigned    font:1;  /* This write selects a font    */
        unsigned    polf:1;  /* Send post order linefeed     */
        unsigned    npcr:1;  /* No post order carriage return */
        unsigned    ris:1;   /* Cmd write - Send an RIS      */
        unsigned    dc4:1;   /* Cmd write - Post order DC4   */
        unsigned    clr:1;   /* Cmd write - Send clear       */
    }       pwrite;

struct
    {               /* Polled-vip connect      */
        unsigned    blck:1;  /* Block processing            */
        unsigned    time:1;  /* Time out immediately        */
        unsigned:   1;       /* Bit 2 not defined here      */
        unsigned    nchm:1;  /* No cursor home on overflow  */
        unsigned:   1;       /* Bit 4 not defined here      */
        unsigned    ssup:1;  /* Space suppression           */
        unsigned    nrol:1;  /* No roll                     */
        unsigned    hwfc:1;  /* Send device hdw funct codes */
        unsigned:   8;       /* Bits 8 to 15 not defined here */
    }       vconn;

struct
    {               /* Polled-vip disconnect    */
        unsigned:   1;       /* Bit 0 not defined here      */
        unsigned    deot:1;  /* Send DLE EOT on disconnect  */
        unsigned:   14;      /* Bits 2 to 15 not defined here */
    }       vdisc;

struct
    {               /* Polled-vip read         */
        unsigned:   9;       /* Bits 0 to 8 not defined here */
        unsigned    supr:1;  /* Supervisory read            */
        unsigned:   6;       /* Bits 10 to 15 not defined here */
    }       vread;

struct
    {               /* Polled-vip write        */
        unsigned:   4;       /* Bits 0 to 3 not defined here */
        unsigned    ncbt:1;  /* No control byte present     */
        unsigned:   1;       /* Bit 5 not defined here      */
        unsigned    tetb:1;  /* Terminate with ETB          */
        unsigned:   1;       /* Bit 7 not defined here      */
        unsigned    nack:1;  /* No supervisory ACK          */
        unsigned    supw:1;  /* Supervisory write           */
        unsigned:   1;       /* Bit 10 not defined here     */
        unsigned    polf:1;  /* Send post order linefeed    */
        unsigned    npcr:1;  /* No post order carriage return */
        unsigned:   3;       /* Bits 13 to 15 not defined here */
    }       vwrite;
};

/* Mask definitions */
/* Connect common    */
```

Page A-25

```
#define DV1_PTERM 0x8000      /* PTERM (switching back to HVS) */
#define DV1_MODE  0x00F0      /* Encoded mode values           */
#define DV1_MLRN  0x0008      /* Connect in master LRN proc    */
#define DV1_SRIS  0x0004      /* Send an RIS                   */
#define DV1_INIT  0x0002      /* Initiate type connect         */
#define DV1_LOG   0x0001      /* logical: Don't establish cnect */

/* Disconnect common      */

/* #define DV1_PTERM 0x8000 */  /* PTERM (switching to XC)       */
#define DV1_NABT  0x0002      /* Do not abort outstanding ordrs */
#define DV1_NRLS  0x0001      /* Do not release connection     */

/* Read common      */ define DV1_ABRT  0x8000      /* Abort all outstanding orders  */
define DV1_EVNR  0x4000      /* Event notification proc read  */

/* Write common     */

/* #define DV1_ABRT 0x8000 */   /* Abort all outstanding orders  */
#define DV1_EVNW  0x4000      /* Event notification proc write */

/* Queued event notif.    */ define DV1_CANTYP 0x8000     /* Cancel for encoded event type */
define DV1_CANALL 0x4000     /* Cancel all/NOT just the last  */
#define DV1_EEQT   0x0f00     /* encoded queued event type: 0 = Break
                               * (interrupt) 1-F = RFU         */

/* ActiVate non-queued event not. */ define DV1_EENT  0x0f00      /* encoded non-queued event type: 0 =
                               * Print Screen 1-F = RFU        */

/* CaNcel non-queued event notif. */ define DV1_CANTYP 0x8000     /* Cancel Activate event IORB/NOT signal
                               * termination for encoded event type */
/* #define DV1_EENT 0x0f00 */   /* encoded non-queued event type:
                          0 = Print Screen
                          1-F = RFU            */

/* Admin mode read     */

/* #define DV1_EENT 0x0f00 */   /* Encoded event notification type*/
#define DV1_NIWR  0x0080      /* Do not inhibit writes         */
#define DV1_PEOR  0x0040      /* Post on end of range          */
#define DV1_OSRP  0x0020      /* Override suspend/resume protcol */

/* Admin mode write     */

/* #define DV1_EENT 0x0f00 */   /* Encoded event notification type*/
```

Page A-26

```c
/* Message mode connect    */ define DV1_KERM 0x2000      /* Kermit connect            */
define DV1_BSUP 0x1000      /* Bell suppress             */
#define DV1_SRAW 0x0800      /* Raw input selectable in reads */
#define DV1_VTXT 0x0400      /* Videotext processing      */
#define DV1_IRAW 0x0200      /* Input is raw (no edit)    */
#define DV1_BUFR 0x0100      /* Buffered mode             */

/* Message mode disconnect    */ define DV1_DEOF 0x4000      /* Send end of file on disconnect */

/* Message mode read    */ define DV1_PEKB 0x1000      /* Post on emptying key ahead buf */
define DV1_IRAW 0x0200      /* Input is raw (not edited) */
#define DV1_PKAH 0x0100      /* Purge keyahead buffer     */
#define DV1_ECHC 0x0080      /* Echo character/Echo constant */
#define DV1_ECHO 0x0020      /* Echo input                */
#define DV1_POLF 0x0010      /* Send post order linefeed  */
#define DV1_NPCR 0x0008      /* No post order carriage return */

/* Message mode write    */ define DV1_NCBT 0x0800      /* No control byte present   */
define DV1_TSTS 0x0400      /* No trail space if p/o c/r */
#define DV1_NBRK 0x0100      /* No stop on interrupt      */
#define DV1_POLF 0x0010      /* Send post order linefeed  */
#define DV1_NPCR 0x0008      /* No post order carriage return */
#define DV1_PEOF 0x0004      /* Cmd write - Post order EOF */
#define DV1_PINT 0x0002      /* Cmd write - Post order interrt */
#define DV1_EWRT 0x0001      /* Edited write              */

/* Field mode connect    */

/* #define DV1_BSUP 0x1000    */ /* Bell suppress         */

/* Field mode read    */

/* #define DV1_ECHC 0x0080    */ /* Echo character/Echo constant */
#define DV1_SUPR 0x0040      /* Supervisory read          */
/* #define DV1_ECHO 0x0020    */ /* Echo input            */

/* Field mode write    */ define DV1_NBRK 0x0100      /* No stop on interrupt      */
define DV1_NACK 0x0080      /* No supervisory ACK        */
#define DV1_SUPW 0x0040      /* Supervisory write         */

/* Block mode connect    */ define DV1_NCWD 0x0800      /* Do not include control word */
define DV1_SSUP 0x0400      /* Space suppression         */
```

Page A-27

```
#define DV1_NROL 0x0200          /* No roll                          */

/* Block mode read          */ define DV1_SUPR 0x0040          /* Supervisory read                 */
/* #define DV1_POLF 0x0010   */ /* Send post order linefeed         */
/* #define DV1_NPCR 0x0008   */ /* No post order carriage return    */

/* Block mode write         */ define DV1_PREW 0x1000          /* Preemptive write                 */
define DV1_NCBT 0x0800          /* No control byte present          */
#define DV1_TETB 0x0200          /* Terminate with ETB               */
#define DV1_NBRK 0x0100          /* No stop on interrupt             */
#define DV1_NACK 0x0080          /* No supervisory ACK               */
#define DV1_SUPW 0x0040          /* Supervisory write                */
/*#define DV1_POLF 0x0010   */ /* Send post order linefeed         */
/*#define DV1_NPCR 0x0008   */ /* No post order carriage return    */

/* Printer mode connect     */ define DV1_NTRN 0x2000          /* Non transparent mode             */

/* Printer mode read        */ define DV1_ATTR 0x2000          /* Attention status read            */

/* Printer mode write       */

/*#define DV1_NCBT 0x0800 */    /* No control byte present          */
#define DV1_TSTS 0x0400          /* No trail space if p/o c/r        */
#define DV1_RTRY 0x0100          /* Retry write                      */
/*#define DV1_POLF 0x0010*/     /* Send post order linefeed         */
/*#define DV1_NPCR 0x0008 */    /* No post order carriage return    */
#define DV1_RIS 0x0004           /* Cmd write - Send an RIS          */
#define DV1_DC4 0x0002           /* Cmd write - Post order DC4       */
#define DV1_CLR 0x0001           /* Cmd write - Send clear           */

/* Polled-vip connect       */ define DV1_BLCK 0x8000          /* Block processing                 */
define DV1_TIME 0x4000          /* Time out immediately             */
#define DV1_NCHM 0x1000          /* No cursor home on overflow       */
#define DV1_SSUP 0x0400          /* Space suppression                */
#define DV1_NROL 0x0200          /* No roll                          */
#define DV1_HWFC 0x0100          /* Send device hdw funct codes      */

/* Polled-vip disconnect    */ define DV1_DEOT 0x4000          /* Send DLE EOT on disconnect       */

/* Polled-vip read          */ define DV1_SUPR 0x0040          /* Supervisory read                 */
```

Page A-28

```
/* Polled-vip write        */ define DV1_NCBT 0x0800        /* No control byte present    */
define DV1_TETB 0x0200        /* Terminate with ETB         */
#define DV1_NACK 0x0080        /* No supervisory ACK         */
#define DV1_SUPW 0x0040        /* Supervisory write          */
/*#define DV1_POLF 0x0010 */   /* Send post order linefeed   */
/*#define DV1_NPCR 0x0008 */   /* No post order carriage return */
```

Page A-29

```c
/*
 * Name:    ntd_dv2.h
 * Purpose: device specific word 2 control bits
 */ union dv2
{
  unsigned short   word;     /* Access it as a word    */ struct
  {                       /* Write common */
      unsigned:  11;      /* Bits 0 to 10 not common      */
      unsigned   purg:1;  /* Purge all outstanding rd & wrt */
      unsigned:  4;       /* Bits 12 to 15 not common     */
  }        cwrite;

struct
  {                       /* Field mode connect       */
      unsigned:  1;       /* Bit 0 not defined here      */
      unsigned   xclc:1;  /* Terminate on calculator + -  */
      unsigned:  2;       /* Bits 2 and 3 not defined here */
      unsigned   vfns:1;  /* Validation field notification */
      unsigned   vset:2;  /* Validation set           */
      unsigned   wpmd:1;  /* Word processing mode     */
      unsigned   dbrk:1;  /* Disable interrupt        */
      unsigned:  3;       /* Bits 9 to 11 not defined here */
      unsigned   coof:1;  /* Cursor out of field      */
      unsigned   kahb:1;  /* Key ahaead buffer        */
      unsigned   esc:2;   /* Escape sequence processing option */
  }        fconn;

struct
  {                       /* Field mode read          */
      unsigned   pkhd:1;  /* Purge key ahead          */
      unsigned   inms:1;  /* Implied numeric shift    */
      unsigned   infd:1;  /* integrated field descriptor */
      unsigned:  4;       /* Bits 4 to 7 not defined here */
      unsigned   ococ:1;  /* Override cursor out of field */
      unsigned   togl:1;  /* Terminate on G1 character */
      unsigned   fdtp:2;  /* Field descriptor type    */
      unsigned:  1;       /* Bits 11 not defined here */
      unsigned   pobl:1;  /* Preorder bell            */
      unsigned   peol:1;  /* Preorder EOL             */
      unsigned   icon:2;  /* ICON significance        */
  }        fread;

struct
  {                       /* Field mode write         */
      unsigned:  12;      /* Bits 0 to 11 not defined here */
      unsigned   pobl:1;  /* Preorder bell            */
      unsigned   peol:1;  /* Preorder EOL             */
      unsigned   icon:2;  /* ICON significance        */
  }        fwrite;
};
```

Page A-30

```c
/* Write common */ define DV2_PURG 0x0010        /* Purge all outstanding rd & wrt */

/* Field mode connect    */ define DV2_XCLC 0x4000        /* Terminate on calculator + -  */
define DV2_VFNS 0x0800        /* Validation field notification */
#define DV2_VSET 0x0600        /* Validation set       */
#define DV2_WPMD 0x0100        /* Word processing mode     */
#define DV2_DBRK 0x0080        /* Disable interrupt    */
#define DV2_COOF 0x0008        /* Cursor out of field  */
#define DV2_KAHB 0x0004        /* Key ahaead buffer    */
#define DV2_ESC  0x0003        /* Escape sequence processing option */

/* Field mode read    */ define DV2_PKHD 0x8000        /* Purge key ahead      */
define DV2_INMS 0x4000        /* Implied numeric shift    */
#define DV2_INFD 0x2000        /* integrated field descriptor */
#define DV2_OCOC 0x0100        /* Override cursor out of field */
#define DV2_TOG1 0x0080        /* Terminate on G1 character   */
#define DV2_FDTP 0x0060        /* Field descriptor type   */
#define DV2_POBL 0x0008        /* Preorder bell    */
define DV2_PEOL 0x0004        /* Preorder EOL     */
#define DV2_ICON 0x0003        /* ICON significance    */

/* Field mode write    */ define DV2_POBL 0x0008        /* Preorder bell    */
define DV2_PEOL 0x0004        /* Preorder EOL     */
#define DV2_ICON 0x0003        /* ICON significance    */
```

Page B-1

APPENDIX B
BIT MASKS

I. Connect DV1 Bits

| ATD Bits | TTY | BLOCK | ASPI | FIELD | AXD REW | AXD FILE-TRAN |
|---|---|---|---|---|---|---|
| 2000 | U | U | U | U | U | U |
| 1000 | 1000 | X | X | X | X | X |
| 0800 | X | 0800 | X | X | X | X |
| 0080 | X | X | X | X | N | N |
| 0040 | X | 0200 | X | X | N | N |
| 0001 | X | X | X | X | 0001 | 0001 |
| All other bits | X | X | X | X | X | X |
| | | | | | | |
| NTD Base DV1 values for ATD Modes | 0020 | 0030 | 0050 | 0040 | 0220 | 0020 |

NTD DV1 bits = Base_Mode + ATD mapped bits in table.

II. Disconnected DV1 Bits

| ATD bits | TTY | BLOCK | ASPI | FIELD | AXD |
|---|---|---|---|---|---|
| 0004 | X | X | X | X | 4000 |
| 0002 | 0002 | 0002 | 0002 | 0002 | 0002 |
| 0001 | 0001 | 0001 | 0001 | 0001 | 0001 |
| All other bits | X | X | X | X | X |

Where   N = no-op
        U = unsupported
        X = not used/not applicable

Page B-2

APPENDIX B - Continued
BIT MASKS

III.  Read DV1 Bits

| ATD Bits | TTY | BLOCK | ASPI | FIELD | AXD |
|---|---|---|---|---|---|
| 8000 | X | 800 | 2000 | X | X |
| 0040 | X | 0040 | X | X | X |
| 0020 | 0020 | X | X | 0020 | 0020 |
| 0010 | 0010 | 0010 | X | X | 0010 |
| 0008 | 0008 | 0008 | X | X | 0008 |
| All other bits | X | X | X | X | X |

IV.  Write DV1 Bit Masks

| ATD BITS | TTY | BLOCK | ASPI | FIELD | AXD |
|---|---|---|---|---|---|
| 8000 | X | 8000 | X | X | X |
| 4000 | X | X | U | X | X |
| 2000 | 2000 | X | X | X | 0001 |
| 1000 | X | 1000 | X | X | 0004 |
| 0800 | 0800 | 0800 | 0800 | X | 0800 |
| 0400 | X | X | X | X | X |
| 0200 | X | 0200 | X | X | 0200 |
| 0100 | 0100 | 0100 | X | 0100 | 0100 |
| 0080 | X | 0080 | X | 0080 | X |
| 0040 | X | 0040 | X | X | X |
| 0020 | X | X | X | X | X |
| 0010 | 0010 | 0010 | 0010 | X | 0010 |
| 0008 | 0008 | 0008 | 0008 | X | 0008 |
| 0004 | U | X | X | X | X |
| 0002 | X | X | 0002 | X | X |
| 0001 | X | X | 0100 | X | X |
| All other bits | X | X | X | X | X |

Where   N = no-op
           U = unsupported
           X = not used/not applicable Page B-3

APPENDIX B - Continued
BIT MASKS

V.  Field Mode DV2 Bits

| ATD Bits | CONNECT | DISCON-NECT | READ | WRITE |
|---|---|---|---|---|
| 8000 | X | X | 8000 | X |
| 4000 | 4000 | X | 4000 | X |
| 2000 | X | X | 2000 | X |
| 1000 | X | X | X | X |
| 0800 | 0800 | X | X | X |
| 0400 | 0400 | X | X | X |
| 0200 | 0200 | X | X | X |
| 0100 | X | X | 0100 | X |
| 0080 | 0080 | X | X | X |
| 0040 | N | X | X | X |
| 0020 | N | X | X | 0010 |
| 0010 | X | X | X | 0010 |
| 0008 | 0008 | X | 0008 | 0008 |
| 0004 | 0004 | X | 0004 | 0004 |
| 0002 | X | X | 0002 | 0002 |
| 0001 | X | X | 0001 | 0001 |

Where   N = no-op
           U = unsupported
           X = not used/not applicable It will be apparent to those skilled in the art that many changes may be made to the preferred embodiment of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method for utilizing a first terminal driver (NTD) component having a number of different operational modes within a host system to accommodate the servicing of user applications designed to use a second driver (ATD) component, the host system having a memory and a hardware platform including a number of terminals used to enter commands for running user applications and for viewing results generated during running user applications, a host input/output services component operatively connected to different ones of the number of terminals for executing host system instructions of user applications, the second driver component having a family of operational modes defined by device specific information included in an input/output request block (IORB) associated with each request issued by a user application, the NTD component being operatively coupled to the input/output services component, the host system further including operating system facilities for providing services for host programs and for initially configuring each of number of terminals which is to utilize the family of second driver operational modes and the NTD component, the method comprising the steps of:

generating a response to an initial monitor call of a user application for determining which driver component is servicing one of the number of terminals being used to run the user application, the response indicating that the second driver component is servicing the terminal when the NTD component has determined that the terminal was previously configured to use the family of second driver operational modes;

translating second driver device specific information in the IORB of each executable request into NTD device specific information defining equivalent ones of the number of different operational modes to be used for executing the request by the NTD component operating in an second driver mode of operation which determines if a request is executable by the NTD component operating in an equivalent second driver mode of operation; and, mapping status information resulting from each executed request into the same format as status which would have been returned by the second driver component enabling the application to run unchanged in the host system.

2. The method of claim 1 wherein the translating step includes comparing ATD device specific information using a number of different masks as a function of the type of request being processed.

3. The method of claim 2 wherein the translating step further includes the steps of grouping the device specific bits into a number of different bit categories which include common options, mappable options and unsupported options.

4. The method of claim 3 wherein said method further includes the step of adding new functionality to the NTD component for servicing unsupported options specified by the second driver device specific bits.

5. The method of claim 4 wherein said method further includes the step of enabling the new functionality initially or after the processing of an initial request as a function of which is more efficient.

6. The method of claim 5 wherein the initial request is a connect request and the new functionality is enabled after the successful completion of the connect request.

7. The method of claim 4 wherein the new functionality is included in a lower layer service provider for enabling processing of other than NTD control character sequences.

8. The method of claim 2 wherein the method further includes the steps of:

validating the NTD device specific information of each request obtained resulting from the translating step in the same manner that other types of requests are validated by the NTD component; and, dispatching each validated request for execution by the NTD component operating in the equivalent second driver mode of operation.

9. The method of claim 1 wherein the method further includes the steps of determining if the request involves a special system function prior to performing the translating step and bypassing translating second driver device specific information when the request involves the special system function.

10. The method of claim 9 wherein the special system function is a print screen command.

11. The method of claim 1 wherein the method further includes the steps of:

adding new functionality in the NTD component for servicing requests requiring the use of additional second driver operational modes; and, generating second driver status values based on status provided by the new functionality in a format which would have been returned by the second driver component.

12. The method of claim 11 wherein the additional second driver operational modes includes a file transfer submode of operation.

13. A first driver (NTD) component having a number of different operational modes for use in a host system having a memory and a hardware platform including a number of terminals used to enter commands for running user applications and for viewing results generated during running user applications, a host input/output services component operatively connected to different ones of the number of terminals for executing host system instructions of user applications wherein at least one user application designed to use a second terminal driver (ATD) component, the second driver component having a family of operational modes defined by device specific information included in an input/output request block (IORB) associated with each request issued by a user application, the NTD component being operatively coupled to the input/output services component, the host system further including operating system facilities for providing services for host programs and for initially configuring each of number of terminals which is to utilize the family of second driver operational modes and the NTD component, the NTD component comprising:

an input section in response to a monitor call received from a user application for determining which driver software is servicing one of the number of terminals being used to run the user application, generating a response indicating that the second driver component is servicing the terminal when the terminal has been previously configured by a user to use the family of second driver operational modes;

a preprocessor operatively coupled to the input section for receiving each request issued by the user application being run by the configured terminal, the preprocessor including a mechanism for translating second driver device specific information in the request IORB into NTD device specific information defining equivalent ones of the different operational modes to be used for executing the request by the NTD component operating in an second driver mode of operation which determines if the request is executable by the NTD component; and, a post processor operatively coupled to the input/output services component for receiving status information resulting from each executed request, the post processor mapping the status information into the same format as status which would have been returned by the second driver component enabling the application to run unmodified in the host system.

14. The first driver component of claim 13 wherein the mechanism of the preprocessor includes a number of different masks for comparing and translating second driver device specific information in the request IORB into NTD device specific information.

15. The first driver component of claim 14 wherein said mechanism groups the device specific bits into a number of different categories, the different categories including common options, mappable options and unsupported options wherein common option bits are those second driver device specific bits which specify the same or equivalent functions and have the same bit positions as NTD device specific bits, mappable option bits are those second driver device specific bits which specify the same or equivalent functions but have different bit positions than the NTD device specific bits and unsupported option bits are those second driver device specific bits which have no equivalency to the NTD device specific bits.

16. The first driver component of claim 13 wherein the number of different operational modes of the NTD component includes a message mode and the family of operational modes of the second driver component includes a TTY mode and an X-ON/X-OFF (AXD) mode having a number of submodes, the NTD component operates in message mode for processing requests previously processed by the second driver component in a TTY mode and certain ones of the submodes of AXD mode.

17. The first driver component of claim 16 wherein the NTD component includes added functionality for supporting other types of application requests requiring different driver software.

18. The first driver component of claim 17 wherein the other types of application requests were previously processed by a number of submodes of the AXD mode of the second driver component.

19. The first driver component of claim 13 wherein the preprocessor further includes a second mechanism for validating translated NTD device specific information of each request that is normally used for validating requests and a dispatching component for dispatching each validated request for execution by the NTD component operating in the equivalent second driver mode of operation.

* * * * *